United States Patent
Bouda et al.

(10) Patent No.: US 8,447,182 B2
(45) Date of Patent: May 21, 2013

(54) MULTI-WAVELENGTH TRANSPONDER WITH WAVELENGTH DIVISION MULTIPLEXING MODULES

(75) Inventors: Martin Bouda, Plano, TX (US); Inwoong Kim, Allen, TX (US); Takao Naito, Tokyo (JP)

(73) Assignee: Fujitsu Limited, Kawasaki-shi (JP)

( * ) Notice: Subject to any disclaimer, the term of this patent is extended or adjusted under 35 U.S.C. 154(b) by 32 days.

(21) Appl. No.: 12/895,371

(22) Filed: Sep. 30, 2010

(65) Prior Publication Data

US 2012/0082458 A1    Apr. 5, 2012

(51) Int. Cl.
*H04J 14/02* (2006.01)
(52) U.S. Cl.
USPC .............. 398/79; 398/68; 398/69; 398/91; 398/95
(58) Field of Classification Search
USPC .............. 398/79, 48, 97, 38, 68, 69, 91, 94, 398/197, 70, 95
See application file for complete search history.

(56) References Cited

U.S. PATENT DOCUMENTS

| 6,906,804 B2 * | 6/2005 | Einstein et al. ............. 356/484 |
| 7,245,829 B1 * | 7/2007 | Sindile ............................ 398/45 |
| 7,881,612 B2 * | 2/2011 | Mitchell et al. ............... 398/34 |
| 2005/0123296 A1 * | 6/2005 | Touma ............................. 398/45 |
| 2006/0051094 A1 * | 3/2006 | Moriwaki et al. ............ 398/84 |
| 2006/0067687 A1 * | 3/2006 | Yasuda et al. ................. 398/33 |
| 2007/0077065 A1 * | 4/2007 | Forsberg et al. ............. 398/30 |
| 2009/0185804 A1 * | 7/2009 | Kai et al. ....................... 398/48 |
| 2010/0183294 A1 * | 7/2010 | Villarruel et al. ............. 398/10 |
| 2010/0239260 A1 * | 9/2010 | Oikawa et al. ................ 398/81 |
| 2011/0292953 A1 * | 12/2011 | Liu et al. ....................... 372/20 |

OTHER PUBLICATIONS

Inferna Corporation; Inferna DTN Switched WDM System; Product Brochure; pp. 4, 2009.
Ferris Lipscomb; "New developments improve AWG's business case"; Lightwave; www.lightwaveonline.com ; pp. 4, Mar. 31, 2005.
Sven Krueger; "Cube Optics AG Releases First LAN WDM Channel (4x25 Gpbs) ROSA for 100 GBPS Multi-lambda Transceivers"; Press Release; Cube Optics AG; pp. 2, Sep. 17, 2009.
IEEE P802.3ba™D3.2; "Part 3: Carrier Sense Multiple Access with Collision Detection (CSMA/CD) Access Method and Physical Layer Specifications"; IEEE Computer Society; pp. 461, Mar. 24, 2010.
NTT Electronics; Photonics Product; "Colorless AWG"; www.ntt-electronics.com ; pp. 2, Jul. 30, 2012.

* cited by examiner

*Primary Examiner* — Daniel Washburn
*Assistant Examiner* — Hibret Woldekidan
(74) *Attorney, Agent, or Firm* — Baker Botts L.L.P.

(57) ABSTRACT

According to one embodiment, a system for transmitting an optical signal comprises a traffic distribution circuit configured to distribute traffic to a plurality of wavelength division multiplexer (WDM) modules. The system further comprises a first WDM module and a second WDM module. The first and second WDM modules each comprise a plurality of tunable optical transmitters, with each transmitter associated with a different wavelength band of a plurality of wavelength bands. Each transmitter in the first and second WDM modules is also tuned to transmit optical signals in channels included within the associated wavelength band of the transmitter. The first and second WDM modules each comprise a multiplexer configured to combine the optical signals transmitted from the plurality of transmitters into optical signals. The system further comprises a cyclic multiplexer configured to combine the optical signals from the first and second WDM modules into an optical output signal.

22 Claims, 11 Drawing Sheets

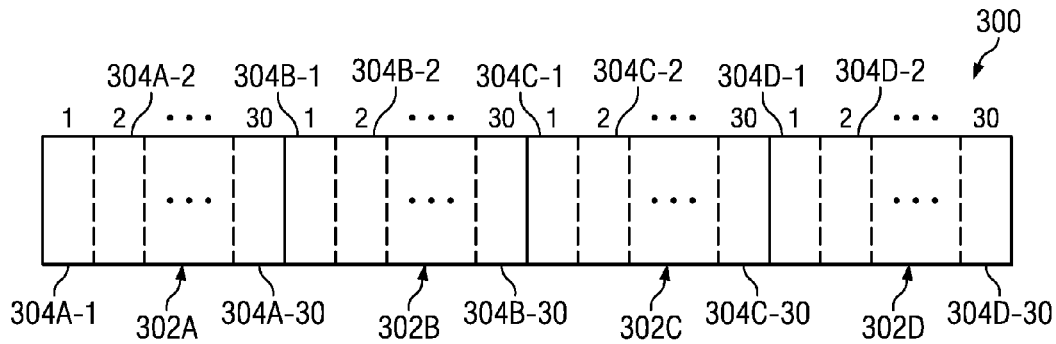
*FIG. 3*
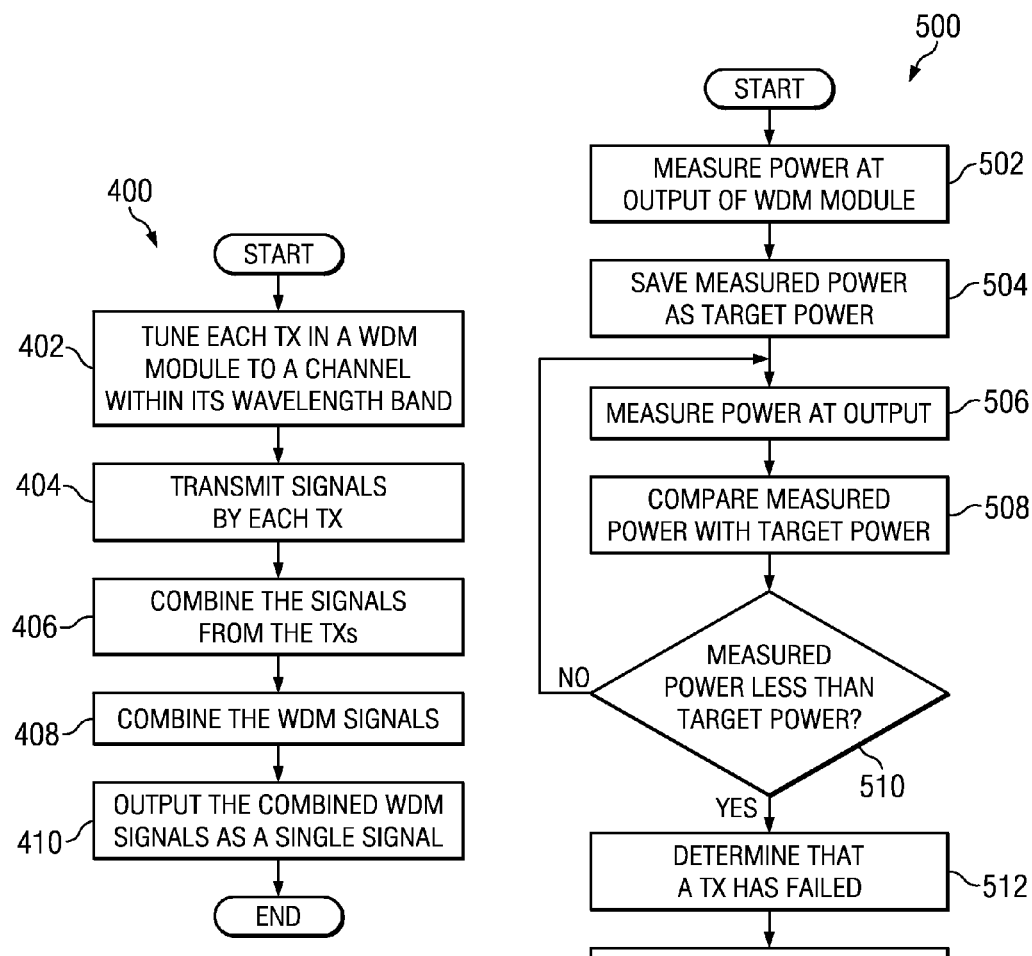
*FIG. 4*
*FIG. 5*

MULTI-WAVELENGTH TRANSPONDER WITH WAVELENGTH DIVISION MULTIPLEXING MODULES

TECHNICAL FIELD

The present disclosure relates generally to optical communication networks and, more particularly, to a method and system for transmitting optical signals using wavelength division multiplexing (WDM) modules.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the optical signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

In WDM and DWDM networks, optical transmitters transmit the optical signals at the optical channels such that each channel corresponds with a transmitter. As the number of required channels increases, the number of required transmitters increases. Also, as the number of transmitters increases the likelihood that one of the transmitters may fail increases. Traditionally, replacing transmitters can be complicated and expensive, but building high quality transmitters to reduce the incidence of failure is also expensive.

SUMMARY

In accordance with the present disclosure disadvantages and problems associated with implementing a reduced cost optical transponder for transmitting wavelength division multiplexed optical signals may be reduced.

In accordance with one embodiment of the present disclosure, a system for transmitting an optical signal using a plurality of wavelength bands, with each wavelength band including a plurality of channels, comprises a traffic distribution circuit configured to distribute traffic to a plurality of wavelength division multiplexer (WDM) modules. The system further comprises a first WDM module. The first WDM module comprises a first plurality of tunable optical transmitters, each transmitter associated with a different wavelength band of the plurality of wavelength bands. Each transmitter is also tuned to transmit optical signals in a first channel included within the associated wavelength band of the transmitter. The first WDM module further comprises a first multiplexer coupled to the first plurality of transmitters and configured to combine the optical signals transmitted from the first plurality of transmitters into a first optical signal. The system also comprises a second WDM module that comprises a second plurality of tunable optical transmitters. Each transmitter in the second WDM module is associated with a different wavelength band of the plurality of wavelength bands and tuned to transmit optical signals in a second channel included within the associated wavelength band of the transmitter. The second WDM module also comprises a second multiplexer coupled to the second plurality of transmitters and configured to combine the optical signals transmitted from the second plurality of transmitters into a second optical signal. The system further comprises a cyclic multiplexer coupled to the first and second WDM modules and configured to combine the first and second optical signals into an optical output signal.

In accordance with another embodiment, a method for transmitting an optical signal using a plurality of wavelength bands, with each wavelength band including multiple channels, comprises distributing, by a traffic distribution circuit, traffic to a plurality of wavelength division multiplexing (WDM) modules. The method further comprises tuning a first plurality of tunable optical transmitters included in a first WDM module to a first channel included within each of the plurality of wavelength bands. Each transmitter in the first WDM module is associated with a different wavelength band of the plurality of wavelength bands. The method further comprises transmitting, by the first plurality of transmitters, optical signals in the first channels and combining, by a first multiplexer coupled to the first plurality of transmitters, the optical signals transmitted from the first plurality of transmitters into a first optical signal. The method also comprises tuning a second plurality of tunable optical transmitters included in a second wavelength division multiplexing (WDM) module to a second channel included within each of the plurality of wavelength bands. Each transmitter included in the second WDM module is associated with a different wavelength band of the plurality of wavelength bands. The method further comprises transmitting, by the second plurality of transmitters, optical signals in the second channels and combining, by a second multiplexer coupled to the second plurality of transmitters, the optical signals transmitted by the second plurality of transmitters into a second optical signal. Additionally, the method comprises combining, by a cyclic multiplexer coupled to the first and second WDM modules, the first and second optical signals into an optical output signal.

BRIEF DESCRIPTION OF THE DRAWINGS

For a more complete understanding of the present invention, and the advantages thereof, reference is now made to the following written description taken in conjunction with the accompanying drawings, in which:

FIG. 3 illustrates a plurality of wavelength bands comprising a plurality of channels;

FIG. 4 illustrates an example method for interfacing a plurality of WDM modules;

FIG. 5 illustrates an example method for determining if a transmitter within a WDM module has failed;

DETAILED DESCRIPTION

Figure 1A:
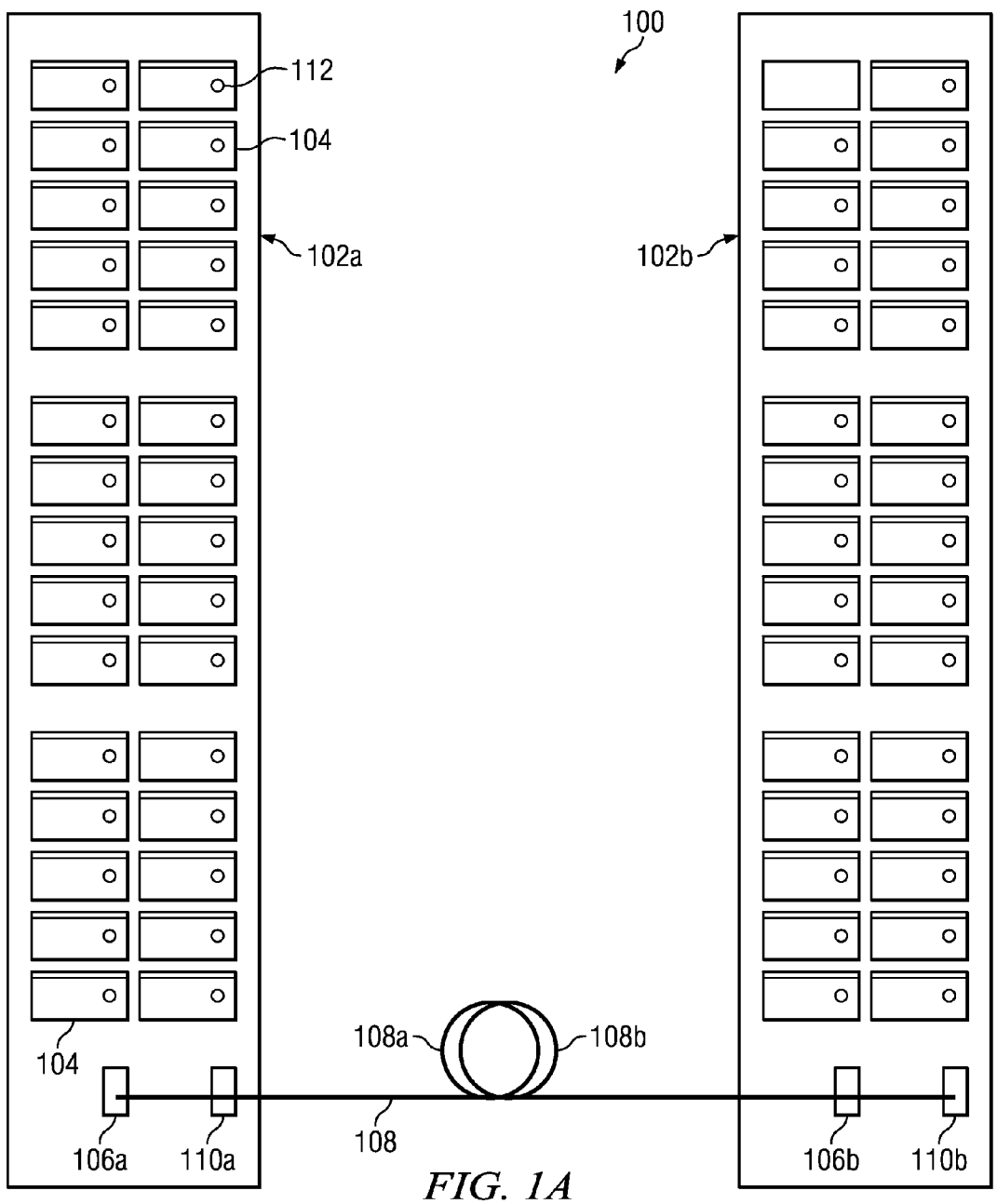
FIG. 1A illustrates an example system comprising a plurality of modular transponders configured to interface wavelength division multiplexer (WDM) modules.

Embodiments of the present disclosure and its advantages are best understood by referring to FIGS. 1-15, where like numbers are used to indicate like and corresponding parts.

FIG. 1 illustrates an example system 100 comprising a plurality of modular transponders 102 configured to interface wavelength division multiplexer (WDM) modules 104. As described below, each module is configured to transmit optical traffic at particular optical channels of a band of optical wavelengths.

Transponders 102 may be included in any optical network. Optical networks may comprise a plurality of optical components configured to transmit information between each other using optical signals. Optical networks may include fibers configured to transport one or more optical signals communicated by components of the optical network.

Optical networks may transmit optical signals at specific wavelengths or channels. Each channel may be configured to carry a certain amount of information along fibers. To increase the information carrying capabilities of an optical network, multiple optical signals transmitted at multiple channels may be combined into a single optical signal that may be transmitted via a single fiber.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength.

Optical networks comprise optical transmitters configured to transmit optical signals at specific channels. Each channel may correspond with a different transmitter. Therefore, the more channels used by an optical network, the more transmitters that network requires. As the bandwidth and channel requirements of optical networks increase, the number of required transmitters also increases. However, as the number of transmitters increases, the likelihood that one of the transmitters may fail also increases.

Replacing individual transmitters can be complicated and costly. Traditionally, to reduce the likelihood of transmitter failure in systems that utilize many transmitters (e.g., DWDM systems), transmitters may be built to exacting standards. However, transmitters built to exacting specifications are expensive and implementing systems that utilize many transmitters can be cost prohibitive. Further, because each transmitter corresponds to a different channel and consequently transmits at a different wavelength, replacing individual transmitters may require ordering a specialized transmitter, or at the least, manufacturing and having on hand many different transmitters.

Therefore, a method and system for easily replacing and bypassing failed, standard transmitters may be advantageous for lowering costs and implementing more efficient optical systems. Having a small number of different tunable transmitters that may transmit optical signals at various channels may reduce the need for specific transmitters transmitting at specific channels, thus simplifying replacement of failed transmitters. Easy to replace, interchangeable transmitters may lower the cost of replacing failed transmitters. Further, transmitters with lower replacement costs may be manufactured according to less stringent specifications and may be manufactured at a lower cost. Even if the transmitters fail at a higher rate, the cost of replacing an inexpensive, easy to replace transmitter may be lower than implementing a system with expensive transmitters manufactured according to stringent standards.

Referring back to FIG. 1A, transponders 102 may be configured to interface easily interchangeable and replaceable, low cost, pluggable WDM modules 104 to reduce the costs associated with implementing transmitters in optical systems. WDM modules 104 may comprise any system device or apparatus configured to transmit optical signals within an optical network. Transponders 102 may include a plurality of slots (not expressly shown) configured to receive WDM modules 104, with each slot configured to receive a different WDM module 104.

Each slot and pluggable WDM module 104 may include optical interfaces that correspond with each other. Accordingly, the optical interface associated with the slot may be configured to couple to the optical interface associated with the WDM module 104 to allow for transponder 102 to be optically coupled to, and optically interface with, each WDM module 104 inserted into each slot. The optical interfaces between the slots and WDM modules 104 may allow for optical connections that may not require optical fibers, thus facilitating the insertion and removal of WDM modules 104 with respect to transponder 102.

Additionally, each slot and pluggable WDM module 104 may include electrical interfaces that correspond with each other and located on the same end as the optical interfaces. The electrical interface associated with the slot may be configured to couple to the electrical interface associated with the WDM module 104 to allow for transponder 102 to be electrically coupled to, and electrically interface with, each WDM module 104 inserted into each slot. Having the electrical and optical interfaces located on the same end may also allow for easy insertion and removal of WDM modules 104 with respect to transponder 102.

Each WDM module 104 may include a plurality of tunable optical transmitters. The transmitters may be tuned to transmit optical signals at specific channels and WDM modules 104 may be configured to wavelength division multiplex the optical signals into a single optical signal.

Each WDM module 104 may be identical to the other WDM modules 104. Because the transmitters in each WDM module 104 are tunable to transmit at multiple wavelengths, the need for individual, channel specific transmitters may be reduced. Thus, the individual transmitters in each WDM module 104 may be configured to transmit optical signals at the same channels as the individual transmitters in other WDM modules 104. Having one interchangeable WDM module 104 may lower costs due to only having to manufacture one type of WDM module to replace a WDM module with one or more failed transmitters instead of needing a specific replacement transmitter for a failed transmitter.

Figure 1B:
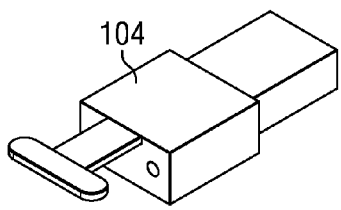
FIG. 1B illustrates an example of a WDM module.

FIG. 1B depicts an example embodiment of a WDM module 104 that may interface with transponder 102. WDM modules 104 and the slots of transponder 102 may be configured to allow easy insertion and removal of WDM modules 104, thus facilitating replacement of a WDM module 104 if a transmitter within the WDM module 104 fails. Accordingly, both labor and network unavailability costs associated with replacing WDM modules 104 may be relatively low compared to traditional methods and systems for replacing failed transmitters.

The transmitters within WDM modules 104 may comprise simpler, less expensive transmitters than transmitters used in other systems. The ease of replacing WDM modules 104 may require less labor and easier steps compared to replacing transmitters in other systems. Accordingly, transmitter failure in a WDM module 104 may also require less labor and maintenance costs, thus reducing the need to utilize expensive transmitters manufactured at very high standards.

As described below with respect to FIG. 2, transponders 102 may also be configured to combine the optical signals of each WDM module 104 associated with the transponders into a single optical output signal transmitted out of one or more optical output ports 106 to a fiber 108. Transponders 102 may also include one or more input ports 110 optically coupled to a fiber 108 and configured to receive the optical signals transmitted from another transponder 102. Transponders 102 may comprise one or more optical receivers (not expressly shown) configured to receive the optical input signals from an input port 110. Fibers 108 may comprise any suitable type of fiber for carrying optical signals, such as a Single-Mode Fiber (SMF) or Multi-Mode Fiber (MMF).

Transponders 102 may also include one or more electrical input ports (not expressly shown) configured to receive electrical signals that may be converted to optical signals, by the transmitters included within WDM modules 104, to be transmitted through optical output port 106.

The plurality of WDM modules 104 included in transponders 102 may include spare WDM modules 104 and active WDM modules 104. Spare and active WDM modules 104 may comprise the same standard WDM modules 104, but may perform different functions. Initially, transponders 102 may send electrical signals for optical transmission over active channels associated with the transmitters within active WDM modules 104. However, if the active channel fails (e.g., a transmitter within an active WDM module 104 fails), transponders 102 may send the electrical signals that were going to the transmitter associated with the failed channel to a spare transmitter in a spare WDM module 104 associated with a spare channel. Accordingly, the signals are being sent over a spare channel associated with the spare transmitter instead of to the transmitter associated with the failed channel.

Channels commonly fail due to the failure of the transmitters associated with the channels. Therefore the present disclosure discusses failure of transmitters specifically. However, the present disclosure should not be limited to such. Although failures of transmitters are extensively described, it should be understood that any failure of a channel due to any other factor, such as a down receiver, another component associated with the channel, etc., may cause transponders 102 to switch from a transmitter associated with the failed channel to a transmitter associated with a spare channel Without spare WDM modules 104, an active WDM module 104 may need to be replaced upon failure of any transmitter included in the active WDM module 104 to maintain the bandwidth of the system and prevent loss of data being sent over the failed channel associated with the failed transmitter. However, with spare WDM modules 104 having transmitters associated with spare channels, multiple channels associated with transmitters in multiple active WDM modules 104 may fail before an active WDM module 104 with one or more transmitters associated with failed transmitters may need to be replaced. Thus, spare WDM modules 104 may reduce the number of maintenance and replacement visits, which may further reduce costs.

WDM modules 104 may also include an indicator 112. Indicator 112 may indicate when the WDM module 104 associated with the indicator has a transmitter associated with a failed channel (e.g., a failed transmitter). Thus, indicator 112 may further facilitate replacement of WDM modules 104 by easily identifying those modules that need to be replaced. The indicators may indicate a required or preferred replacement sequence, or a level of urgency of replacement. Indicator 112 may comprise any system, apparatus or device that may indicate that a module 104 includes a failed transmitter. In some embodiments indicator 112 may comprise a light emitting diode (LED) or any other suitable device. In some embodiments, indicator 112 may indicate that a transmitter has failed, but not specify which transmitters have failed. In other embodiments, indicator 112 may indicate which transmitters 204 have failed, how many transmitters 204 have failed or both. Indicators may also indicate additional information such as time to expected failure and other characteristics of the WDM module.

Additions, modifications or omissions may be made to FIGS. 1A and 1B without departing from the scope the present disclosure. For example, system 100 may include any number of transponders 102 and not just the two transponders 102 depicted. Further, each transponder 102 may include more or fewer WDM modules 104 than those depicted. The number of WDM modules 104 and transponders 102 may depend on the limitations and requirements of the system 100 being implemented.

Figure 2:
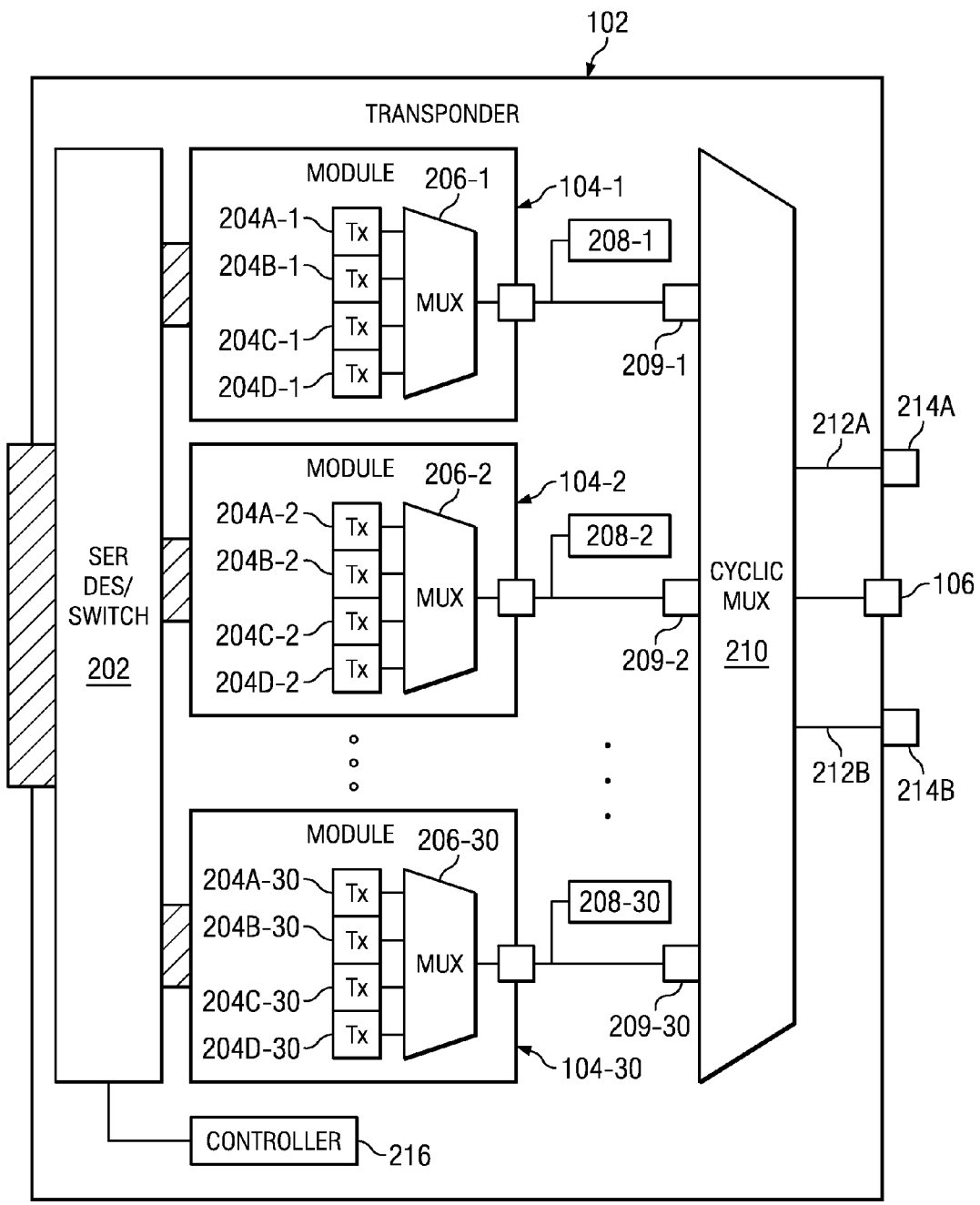
FIG. 2 illustrates an example modular transponder comprising a plurality of WDM modules.

FIG. 2 illustrates an example transponder 102 comprising a plurality of WDM modules 104 in further detail. Transponder 102 may include a Serializer/DeSerializer Switch (SerDes Switch) 202, a plurality of WDM modules 104 that may each include a plurality of tunable optical transmitters (Tx) 204 and a multiplexer 206. Transponder 102 may further include power monitors 208 coupled to the outputs of WDM modules 104 and a cyclic multiplexer 210. Cyclic multiplexer 210 may include output 106 and offset outputs 214. Transponder 102 may also include a controller 216.

SerDes Switch 202 may be any apparatus, system or device configured to receive a serial signal and transmit that signal among parallel outputs. In the present embodiment, SerDes Switch 202 may be configured to receive one or more electrical input signals and transmit those electrical input signals among the transmitters 204 included in the plurality of WDM modules 104. SerDes Switch 202 may also be configured to switch from sending electrical signals to a failed transmitter 204 included in an active WDM module 104 to sending those electrical signals to a spare transmitter 204 included in a spare WDM module 104. Accordingly, SerDes switch may be used to reroute traffic from a failed channel associated with a failed transmitter to a spare channel associated with a spare channel.

SerDes Switch 202 may be coupled to controller 216. Controller 216 may include any system, apparatus or device configured to perform calculations or operations or direct other components within transponder 102 to perform operations. For example, controller 216 may direct and control SerDes Switch 202 to switch sending traffic from one transmitter 204 in a WDM module 104 to another transmitter 204 included in the same or a different WDM module 104.

Controller 216 may include a processor and memory. The memory may store information, instructions or both and the processor may be configured to execute the instructions with respect to the stored information. Although only one controller 216 is depicted, transponder 102 may include one or more controllers 216. Further, individual components within transponder 102 may included one or more controllers 216 also. For example, transponder 102 may include a traffic distribution circuit that includes SerDes Switch 202 and a controller 216. The controller 216 included in the traffic distribution circuit may be configured to control the distribution of traffic by SerDes Switch 202. Additionally, transponder 102 may include another controller 216 configured to control other components of transponder 102.

Transmitters 204 included in WDM modules 104 may be communicatively coupled to SerDes Switch 202. Each transmitter 204 may be any system, apparatus, or device configured to convert an electrical signal into an optical signal, and transmit the optical signal throughout an optical network. For example, transmitters 204 may each comprise a laser and a modulator configured to receive electrical input signals, and modulate the information contained in the electrical input signals onto the wavelength or channel of light produced by the laser, and transmit the wavelength of light with the information as an optical signal through a fiber.

Each transmitter 204 within a WDM module 104 may be associated with a specific and different wavelength band. Further, each transmitter 204 may be tuned to transmit an optical signal at a channel included in its respective wavelength band.

By being tunable to different channels within each wavelength band, each transmitter 204 within WDM modules 104 may transmit optical signals at various channels instead of having a specific transmitter to transmit optical signals at a specific channel. Further, by having a plurality of transmitters 204 that are configured to be tuned to transmit optical signals at channels within different wavelength bands, even more channels may be utilized without requiring a large number of different transmitters 204.

Additionally, by having transmitters 204 being tunable over a limited wavelength band instead of the entire spectrum of wavelengths, each transmitter 204 may be less expensive, further reducing costs. However, the size of the wavelength bands may still require a much smaller number of different transmitters 204 necessary to transmit at the different channels within the system, which may reduce the necessity of manufacturing many different transmitters 204. Thus, the costs associated with producing many different transmitters 204 may still be limited.

The number of different transmitters 204 in each WDM module 104 may be limited to the number of wavelength bands. Therefore, the number of different transmitters 204 necessary to include in one WDM module 104 may be limited, thus reducing costs. Alternatively a single type of tunable transmitter may be used that covers the entire spectrum but without the requirement of having to operate to specification outside of a designated wavelength band associated with the necessary spectrum. The illustrated embodiment utilizes four wavelength bands; thus, each WDM module 104 may include four different transmitters 204 with each transmitter 204 corresponding to a different wavelength band. However, other systems may include more or fewer transmitters 204, depending on the requirements and limitations of the system, without departing from the scope of the present disclosure.

To further explain wavelength bands and the channels included within the wavelength bands, reference is now made to FIG. 3. FIG. 3 illustrates a plurality of wavelength bands comprising a plurality of channels. In the present example, a wavelength spectrum 300 may be divided into four equal wavelength bands—band 302A, band 302B, band 302C and band 302D. Each band 302 may represent a range of wavelengths within spectrum 300.

Each band 302 may also be further divided into a plurality of channels 304. Each channel 304 may comprise or be associated with (e.g. centered around) a discrete wavelength within each band 302. In the present example, each band 302 may include thirty discrete channels 304. For example, band 302A may include channels 304A-1, 304A-2, 304A-3 . . . 304A-30. Accordingly, in the present example, if each channel within spectrum 300 were utilized for transmitting optical signals, one hundred twenty (120) different channels may be utilized (4 bands×30 channels/band=120 channels).

Although, in the present example, spectrum 300 is shown to include four bands 302 with each band including thirty channels 304, the present disclosure should not be limited to such. The number of bands and channels may be more or fewer depending on the system requirements and capabilities. For example, the number of bands may depend on the number of channels implemented in a system and the tuning spectrum of transmitters 204.

Returning to FIG. 2, each transmitter 204 in modules 104 may correspond with a wavelength band depicted in FIG. 3. For example, transmitter 204A-1 included in module 104-1 may correspond to band 302A, transmitter 204B-1 may correspond to band 302B, transmitter 204C-1 may correspond to band 302C and transmitter 204D-1 may correspond to band 302D. Transmitters 204 included in modules 104-2 through 104-30 may also similarly correspond to bands 302A-302D.

Each transmitter 204 within modules 104 may also be tuned to specific channels that correspond with that module 104. For example, module 104-1 may correspond with the first channel of each band 302. Thus, transmitter 204A-1 may be tuned to channel 304A-1 of band 302A, transmitter 204B-1 may be tuned to channel 304B-1 of band 302B, transmitter 204C-1 may be tuned to channel 304C-1 and transmitter 204D-1 may be tuned to channel 304D-1. The remaining modules 104 may similarly correspond to specific channels, and the transmitters 204 may similarly be tuned to these corresponding channels.

The number of modules 104 included in transponder 102 may correspond to the number of channels per band 304 because each module 104 may correspond with a specific channel 304 within bands 302. In the present example, each band 302 may include thirty channels 304; therefore transponder 102 may include thirty different modules 104 with four transmitters 104 each. Each transmitter 104 may transmit an optical signal at a different channel, thus giving the system the capability of transmitting optical signals at one hundred twenty (120) different channels.

Even though transponder 102 may transmit optical signals at one hundred twenty different channels, only one type of module 104 that includes only four different types of transmitters 204 may be necessary. Thus, modules 104 may be mass produced at a lower cost and may be interchanged at will to accommodate the full bandwidth of the system instead of relying on individual, channel specific components that may be expensive and difficult to replace to achieve the same bandwidth.

Modules 104 may also include multiplexers 206 optically coupled to transmitters 204 and configured to combine the optical signals transmitted by transmitters 204 into a single, multiplexed, optical signal. For example, multiplexer 206-1 may receive optical signals from transmitters 204A-1, 204B-1, 204C-1 and 204D-1 and combine these optical signals into a single optical signal. Multiplexers 206 may combine the optical signals using any suitable wavelength division multiplexing technique. Multiplexers 206 may comprise any system, apparatus or device configured to perform such operations.

Transponder 102 may also include a cyclic multiplexer 210 configured to receive the optical signals from modules 104 at input ports 209. Each input port 209 may be configured to receive optical signals transmitted at a specific channel 304 within wavelength bands 302. For example, input port 209-1 may be configured to receive optical signals transmitted at channels 304A-1, 304B-1, 304C-1 and 304D-1.

Each band 302 may represent a different cycle of cyclic multiplexer 210 because input ports 209 of cyclic multiplexer 210 may only receive and combine optical signals transmitted at specific wavelengths or channels spaced apart by the wavelength range (width) of each band 302. For example, channels 304A-1 and 304B-1 are spaced apart by the width of bands 302. Thus, because input port 209-1 is configured to receive optical signals transmitted at channels 304 spaced apart by the width of bands 302 (e.g., 304A-1, 304B-1, 304C-1 and 304D-1) input port 209-1 may be configured to receive optical signals transmitted at a channel once every band or cycle, starting at channel 304A-1. Input ports 209-2 through 209-30 may be similarly configured. Cyclic multiplexer 210 may comprise any system, apparatus, or device configured to receive and combine optical signals according to cycles.

Accordingly, the optical signals from each module 104 may be sent to the input port 209 that corresponds with the channels of that module 104. For example, transmitters 204A-1, 204B-1, 204C-1 and 204D-1 included in module 104-1 may respectively transmit optical signals at channels 304A-1, 304B-1, 304C-1, and 304D-1. Thus, the optical signals leaving module 104-1 may comprise optical signals transmitted at each of these channels. As stated above, port 209-1 may be configured to receive optical signals transmitted at channels 304A-1, 304B-1, 304C-1, and 304D-1. Therefore, module 104-1 may be associated with input port 209-1 such that optical signals from module 104-1 are sent to input port 209-1. Modules 104-2 through 104-30 may similarly be associated with input ports 209-2 through 209-30.

Cyclic multiplexer 210 may be configured to combine the optical signals received at input ports 209 into a single optical output signal to be transmitted via output port 106. In the present embodiment, the optical signal leaving cyclic multiplexer 210 may comprise as many as one hundred twenty channels. The optical signal received at each input port 209 may comprise four channels that correspond to the four channels of transmitters 204 included in modules 104. Cyclic multiplexer 210 may include thirty input ports 209 to correspond with the thirty modules 104 that may be included in transponder 102. Accordingly, a single optical output signal of cyclic multiplexer 210 may comprise one hundred and twenty channels. If each channel may transmit optical signals at ten gigabits per second, cyclic multiplexer 210 may output an optical signal with a bandwidth capability of 1.2 terabits per second.

Thus, by interfacing SerDes Switch 202, modules 104 and cyclic multiplexer 210, transponder 102 may transmit a high bandwidth optical signal using low cost, interchangeable components, instead of the high cost, specialized components used in other systems. The transmission system can be made tolerant to WDM module failures, which can be corrected in-service. Multiple levels of multiplexing and pluggable submodules may be used.

The transponder on the receiving end may contain a single multi-wavelength receiver connected to a SerDes Switch, or a similar structure of multiple stages of demultiplexing and multi-wavelength receiver units connected to the SerDes Switch. The receivers may be separate or included in WDM modules. The SerDes switch may ensure proper ordering of signals and combining of these into an appropriately formatted digital signal stream to be outputted over the electrical interface.

FIG. 4 illustrates an example method 400 for interfacing a plurality of WDM modules to achieve a high bandwidth optical signal at a low cost.

Method 400 may start at step 402, and transponder 102 may tune each transmitter 204 in WDM modules 104 to the channels 304 associated with each module 104. At step 404, each transmitter 204 of each WDM module 104 may transmit optical signals at its tuned channel 304 within its associated band 302.

At step 406, each module 104 may combine the optical signals transmitted by the transmitters 204 into a single, multiplexed, optical signal. Each module 104 may also send the optical signals to an input port 209 of cyclic multiplexer 210 optically coupled to the module 104. The input port 209 may be configured to receive optical signals transmitted at the channels associated with the module 104.

At step 408, cyclic multiplexer 210 may combine the optical signals received at input ports 209 into a single optical signal. At step 410, cyclic multiplexer 210 may send the single optical signal through optical output port 106 and method 400 may end.

Modifications, additions or omissions may be made to method 400 without departing from the scope of the disclosure.

Returning to FIG. 2, transponder 102 may also include other components to facilitate detecting a failure of one or more transmitters 204. Transponder 102 may also include components to facilitate determining if a transmitter 204 has drifted from transmitting at its desired channel 304. Further, these additional components may facilitate in interfacing a new module 104 with transponder 102.

Transponder 102 may be configured to determine if one or more transmitters 204 have failed, thus requiring replacement of a module 104. Transponder 102 may include a power monitor 208, optically coupled to the output of each multiplexer 206. Power monitors 208 may comprise any system, apparatus or device configured to detect, or measure, or detect and measure the power of the optical signals leaving multiplexers 206. In some embodiments power monitors 208 may comprise a photodiode or any other suitable device that detects the amount of power leaving multiplexers 206. In other embodiments power monitors 208 may comprise a photodiode coupled to a controller configured to measure the power detected by the photodiode and perform operations with respect to the power detected.

Transponder 102 may include a power monitor 208 for each module 104, such as that depicted with respect to FIG. 2. In other embodiments, transponder 102 may include a power monitor 208 configured to monitor the power of more than one module 104. In such embodiments, transponder 102 may also include a switch (not depicted in FIG. 2) coupled to the power monitor 208 and the output of the plurality of modules 104. The switch may include a plurality of input ports and may be configured to receive a portion of the output signals from the modules 104 at its input ports. The switch may also include an output port coupled to the power monitor 208. The output port may be configured to output one of the signals received at one of the input ports. The switch may also be configured to cycle through each of its input ports such that the output port sequentially outputs each signal received at each of the input ports over a given period of time.

Therefore, due to the signal received at each input port of the switch being associated with the output of each module 104, the output of the switch may sequentially output a portion of each signal associated with each module 104. Accordingly, the power monitor 208 coupled to the output of the switch may monitor the power of a plurality of modules 104.

In some embodiments, power monitors 208 may detect a failure of a transmitter 204. For example, power monitor 208-1 may measure the power of the optical signal from multiplexer 206-1. If all transmitters 204-1 are functioning, the amount of power detected by power monitor 208-1 may be at a certain level. However, if one or more transmitters 204-1 fail, the amount of power detected by power monitor 208-1 may decrease substantially due to an optical signal being lost. Accordingly, power monitor 208-1 may detect that one or more TX's 204-1 have failed and that the channels associated with the failed transmitters are subsequently unavailable for carrying traffic.

In another embodiment, transponder 102 may determine that a transmitter 204 has failed by comparing the power level measured by a power monitor 208 with a target power level. A desired or target power level may be set for the optical signals leaving modules 104. A system administrator may set the target power level, or upon initialization of a module 104 after all configurations are completed, the power level of the optical signal leaving the module 104 may be measured and set as the target power level.

Power monitor 208 may be coupled to controller 216. Although only one controller 216 is depicted, in other embodiments, each power monitor 208 may include a controller 216 that directs and performs the operations with respect to that particular power monitor 208.

Controller 216 may be configured to measure the power detected by power monitor 208 and compare that measured power with the target power level. If the measured power is substantially equal to the target power, controller 216 may determine that none of the transmitters 204 included in the module 104 have failed. However, if the measured power is substantially less than the target power, controller 216 may determine that one or more transmitters 204 have failed. The controller may execute additional tests to assess the situation in more detail.

After determining that a transmitter 204 within a module 104 has failed, controller 216 may direct that an indicator 112, as depicted in FIG. 1, indicates that the module 104 includes a failed transmitter 204.

FIG. 5 illustrates an example method 500 for determining if a transmitter 204 within a module 104 has failed.

Method 500 may start, and, at step 502, controller 216 may measure the power output of a module 104, using a power monitor 208 or any other suitable device.

At step 504, controller 216 may save the measured power as a target power output for the optical signal leaving the module 104. In alternative embodiments, a system administrator may enter a power level for the target power output level and controller 216 may save the entered power level as the target power output level.

At step 506, controller 216 may continue measuring the power level of the optical output signal of the WDM module 104. At step 508, controller 216 may compare the measured power with the saved target power.

At step 510, controller 216 may determine if the measured power is less (or more) than the target power according to a deviation threshold. If the measured power is not less than the target power according to the deviation threshold, method 500 may return to step 506. If the measured power is less than the target power according to the deviation threshold, method 500 may proceed to step 512.

Deviation thresholds may be selected to avoid false failure alarms due to typical power variation due to environmental conditions, acceptable degradations over time and appropriately detect critical loss of performance. For example, the threshold may be set to correspond to a specified maximum reduction of transmitter output power of 10%. In a WDM module that includes four transmitters and assuming that the output power from the other transmitters does not increase, the deviation threshold may be set to 2.5% (10%/4).

Alternatively, if the link can tolerate larger deviations, the deviation threshold may be set to correspond to a maximum allowed deviation per transmitters. For instance, if a 50% change per channel is tolerated, and assuming the output power of individual transmitters might rise by up to 10%, and if there are four transmitters in a module, the deviation threshold may be set to $1*(\frac{1}{4})*50\%-3*(\frac{1}{4})*10\%=5\%$.

In another example, if laser output power can only decrease, the deviation threshold may be set to $1*(\frac{1}{4})*50\%=12.5\%$ to decrease the number of times it is determined that a WDM module potentially includes a failed transmitter. Finally, to allow larger acceptable variations of output power variations of transmitters due to expected drift, the system may re-calibrate the output power of the transmitters periodically or after a determination that a transmitter has failed. Thus, a suitable deviation threshold may be selected depending on the specific design and device characteristics of the system to ensure reliable operation of the system.

At step 512, controller 216 may determine that a transmitter 204 within module 104 has failed due to the reduced power. At step 514, controller 216 may indicate that the WDM module 104 includes a failed transmitter and method 500 may end.

Modifications, additions or omissions may be made to the steps in method 500 without departing from the scope of the disclosure. For example, the target power may be measured upon initialization of a module 104, or it may be set by a system administrator. Also, although method 500 has been described with respect to controller 216 performing the steps, any appropriate component included within transponder 102 may perform, one or more of the steps described without departing from the scope of the disclosure.

Transponder 102 may also be configured to determine or detect if one or more transmitters 204 are transmitting optical signals at channels 304 other than their desired channels 304.

Cyclic multiplexer 210 may be configured to divert optical signals transmitted at channels that input ports 209 are not configured to receive but that are sent to input ports 209 anyway. Cyclic multiplexer 210 may divert these offset signals to an offset output 212 instead of combining them with the other optical signals. Cyclic multiplexer 210 may include one or more offset outputs 212.

In the present embodiment, cyclic multiplexer 210 includes offset output 212A and offset output 212B. Cyclic multiplexer 210 may be configured to send optical signals transmitted at channels below the target channels to offset output 212A and may be configured to send optical signals transmitted at channels above the target channel to offset output 212B. By diverting optical signals—transmitted at channels that an input port 209 is not configured to receive—to offset outputs 212, cyclic multiplexer 210 may indicate that a transmitter 204 is transmitting at a channel that is different than its desired channel 304.

Offset outputs 212 may each be coupled to an offset monitor 214. Offset monitors 214 may indicate if an optical signal is diverted to offset outputs 212 by detecting optical signals transmitted from offset outputs 212. Offset monitors 214 may also measure the power of optical signals transmitted out of offset outputs 212 and thus, determine, or be used to determine, if a transmitter 204 is transmitting optical signals at a channel that is different than its desired channel.

For example, transmitter 204A-2 may be transmitting optical signals at channel 304A-1 instead of channel 304A-2, and, therefore, optical signals sent to input port 209-2 may include optical signals sent at channel 304A-1. Because input port 209-2 may not be configured to receive optical signals sent at channel 304A-1, and because channel 304A-1 is below the target channel of 304A-2, cyclic multiplexer 210 may divert the optical signals transmitted at channel 304A-1 to offset output 212A. Alternatively if transmitter 204A-2 were transmitting optical signals at channel 304A-3 instead of the target channel of 304A-2, cyclic multiplexer 210 may divert the optical signals transmitted by transmitter 204A-2 at channel 304A-3 to offset output 212B.

In addition to determining that a transmitter 204 within a module 104 has failed, Controller 216 may also determine which transmitter 204 has failed by utilizing offset output monitors 214.

Figure 6:
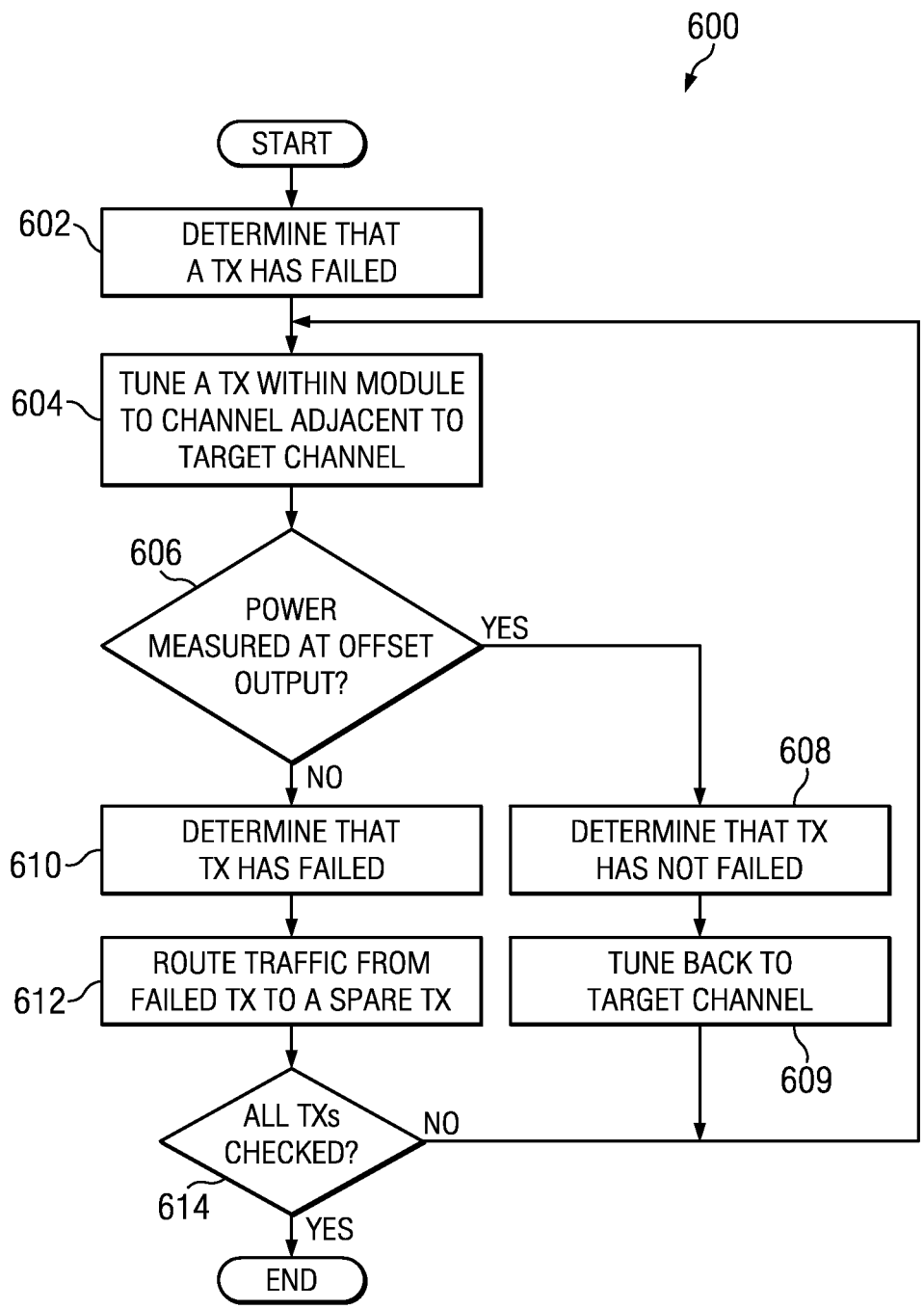
FIG. 6 illustrates an example method for identifying a failed transmitter.

FIG. 6 illustrates an example method 600 for identifying a failed transmitter. Method 600 may start, and at step 602, using a method similar to method 500 disclosed in FIG. 5, controller 216 may determine that a transmitter 204 within a module 104 has failed. In the present example, controller 216 may determine that a transmitter 204 within module 104-2 has failed.

At step 604, controller 216 may tune each transmitter 204 within the module 104, to a channel 304 adjacent to the target channel of that transmitter 204. For example, controller 216 may tune transmitter 204A-2 to channel 304A-1 instead of the target channel of 304A-2 for transmitter 204A-2.

At step 606, controller 216 may determine if an offset monitor 214 is detecting an optical signal or measuring the power of an optical signal due to the transmitter 204 being tuned to an offset channel. In the present example, controller 216 may determine if offset monitor 214A is detecting the optical signal from transmitter 204A-2, due to transmitter 204A-2 being tuned to channel 304A-1 instead of 304A-2. If offset monitor 214 detects an optical signal, method 600 may proceed to step 608, otherwise method 600 may proceed to step 610.

At step 608, controller 216 may determine that the transmitter 204 has not failed if offset monitor 214 detects an optical signal, because power detected by offset monitor 214 indicates that the transmitter 204 is still transmitting an optical signal. In the present example, if offset monitor 214A detects an optical signal, controller 216 may determine that transmitter 204A-2 has not failed.

At step 609, controller 216 may tune the transmitter 204 back to its target channel and tune another transmitter 204 to its adjacent channel at step 604 to determine if the other transmitter 204 is the failed transmitter 204. In the present example, controller 216 may tune transmitter 204A-2 to its target channel of 304A-2 at step 609 and tune transmitter 204B-2 to channel 304B-1—a channel adjacent to its target channel of 304B-2—at step 604, to determine if transmitter 204B-2 has failed.

At step 610, controller 216 may determine that the transmitter 204 has failed if offset monitor 214 does not detect an optical signal. In the present example, if the transmitter 204A-2 were working properly, offset monitor 214A should detect the optical signal from transmitter 204A-2 due to transmitter 204A-2 being tuned to offset channel 304A-1. Therefore, if transmitter 204A-2 is tuned to an offset channel 304A-1 and offset monitor 214A does not detect an optical signal, controller 216 may determine that transmitter 204A-2 has failed.

At step 612, controller 216 may direct SerDes Switch 202 to route electrical signals from the failed transmitter 204 to a spare transmitter 204, such that traffic may be routed from the channel associated with the failed transmitter to the spare channel associated with the spare transmitter. In the present example, transmitter 204A-30 may comprise a spare transmitter 204 and if controller 216 determines that transmitter 204A-2 has failed, controller 216 may direct SerDes Switch 202 to direct electrical signals from transmitter 204A-2 to transmitter 204A-30. Alternatively, before tuning a channel, traffic may be temporarily redirected to a spare channel to perform parts of procedure 600 without degrading service and the redirection may be undone after step 609.

At step 614, controller 216 may determine if all the transmitters 204 within the module 104 have been checked. If all the transmitters 204 have been checked, method 600 may end, otherwise, method 600 may return to step 604 and check another transmitter 204.

Modifications, additions, and omissions may be made to method 600 without departing from the scope of the disclosure. For example, transponder 102 may not include any spare modules or spare transmitters, and thus, step 612 may not be necessary. Also, while determining which transmitters have failed in a particular module 104, controller 216 may direct all of the electrical signals away from the transmitters in that module to the transmitters in a spare module to ensure that no information is lost while tuning transmitters to offset channels.

Additionally, in an alternative embodiment, controller 216 may tune each transmitter 204 to a wavelength somewhere between the adjacent channel and the target channel such that the offset monitor may still detect the optical signal, but also such that enough of the optical signal from the transmitter 204 is sent to output 106. Therefore, information carried at the channel of the transmitter 204 being tuned may still be transmitted while simultaneously determining which transmitter 204 may have failed. As described with respect to FIG. 7, this tuning may also be used to continuously check the wavelength of each laser and for re-tuning any lasers to a target wavelength, to eliminate wavelength locking or laser wavelength stabilizing function associated with the lasers within the WDM modules which may further reduce cost.

Also, although method 600 has been described with respect to controller 216 performing the steps, any appropriate component included within transponder 102 may perform, one or more of the steps described without departing from the scope of the disclosure.

Controller 216 may also be configured to determine that a transmitter 204 within a module 104 has drifted from its desired wavelength by utilizing offset monitors 214.

Figure 7:
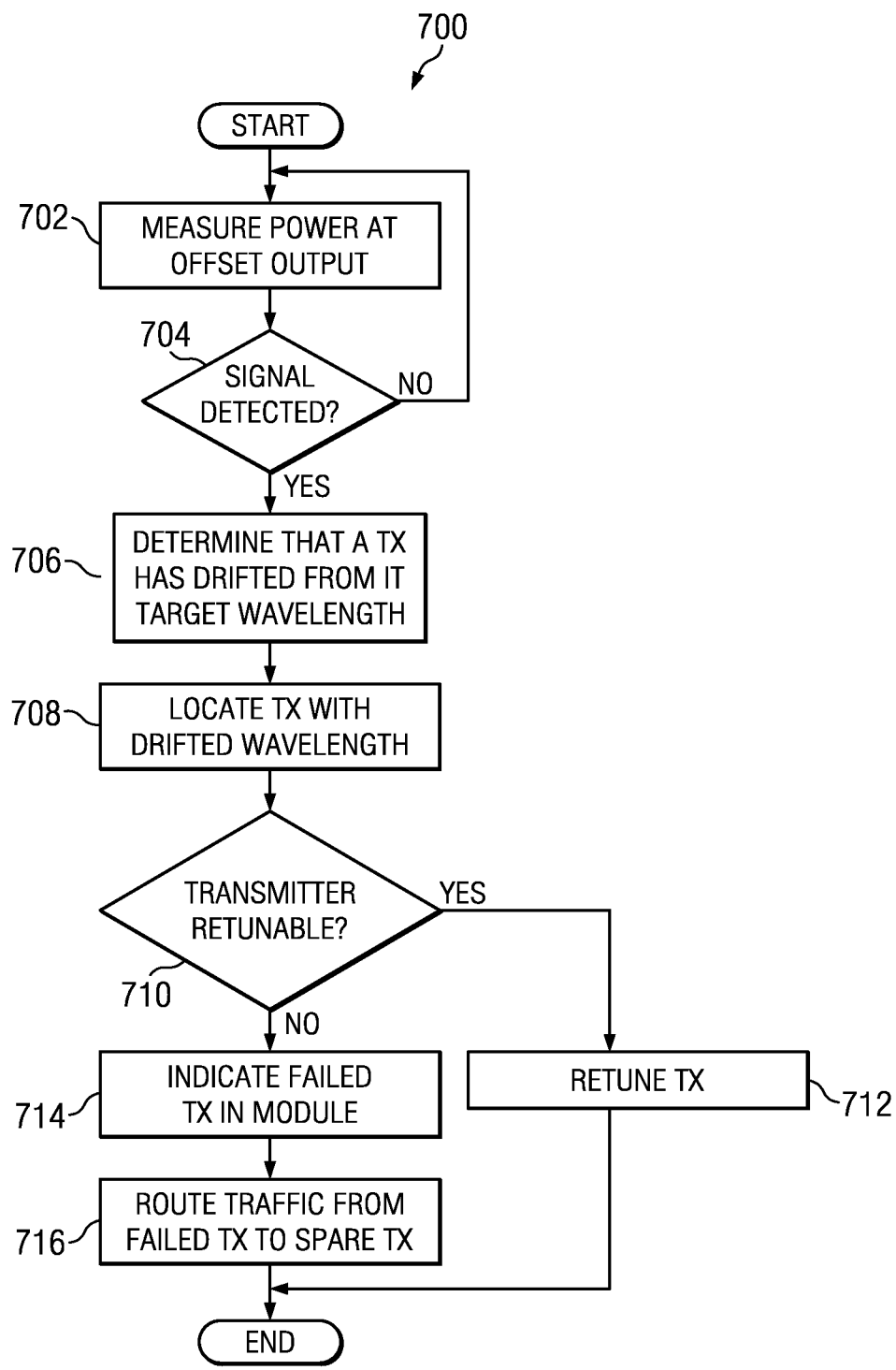
FIG. 7 illustrates an example method for detecting wavelength drift of a transmitter.

FIG. 7 illustrates an example method 700 for detecting wavelength drift of a transmitter 204. Method 700 may start, and, at step 702, offset monitors 214 may measure power at offset outputs 212.

At step 704, controller 216 may determine if an optical signal is detected or measured by offset monitors 214. If offset monitors 214 do not detect any optical signals or measure any power at offset outputs 212, method 700 may return to step 702. If controller 216 determines that either offset monitor 214 or both offset monitors 214 detect optical signals, method 700 may proceed to step 706.

At step 706, controller 216 may determine that a transmitter 204 has drifted from its desired channel or wavelength because one or more offset monitors 214 are detecting optical signals and measuring power at one or more offset outputs 212.

At step 708, controller 216 may locate the transmitter 204 that has drifted from its target wavelength. Controller 216 may identify which transmitters experience wavelength drift in step 708 of FIG. 7 by utilizing offset monitors 214 as described in FIG. 8.

At step 710, controller 216 may determine if the transmitter may be retuned to its targeted channel or wavelength. If the transmitter has merely drifted away from its original tuning and may be retuned, method 700 may proceed to step 712. If the transmitter has drifted due to a failure such as a tuner failure, method 700 may proceed to step 714.

At step 712, controller 216 may retune the transmitter to its desired channel and method 700 may end.

At step 714, controller 216 may indicate that the module 104 includes a failed transmitter. At step 716, controller 216 may direct SerDes Switch 202 to route electrical signals from the failed transmitter to a spare transmitter, such that traffic is rerouted from the failed channel to a spare channel, and method 700 may end.

Modifications, additions, or omissions may be made to method 700 without departing from the scope of the disclosure. For example, transponder 102 may not include any spare modules or spare transmitters, and thus, step 716 may not be necessary. Additionally, although method 700 describes locating a transmitter 204 with wavelength drift, the present disclosure should not be limited to determining a single transmitter with wavelength drift. Further, although the method has been described with respect to controller 216 performing the steps, any suitable component of transponder 102 may perform some or all of the steps described.

Figure 8:
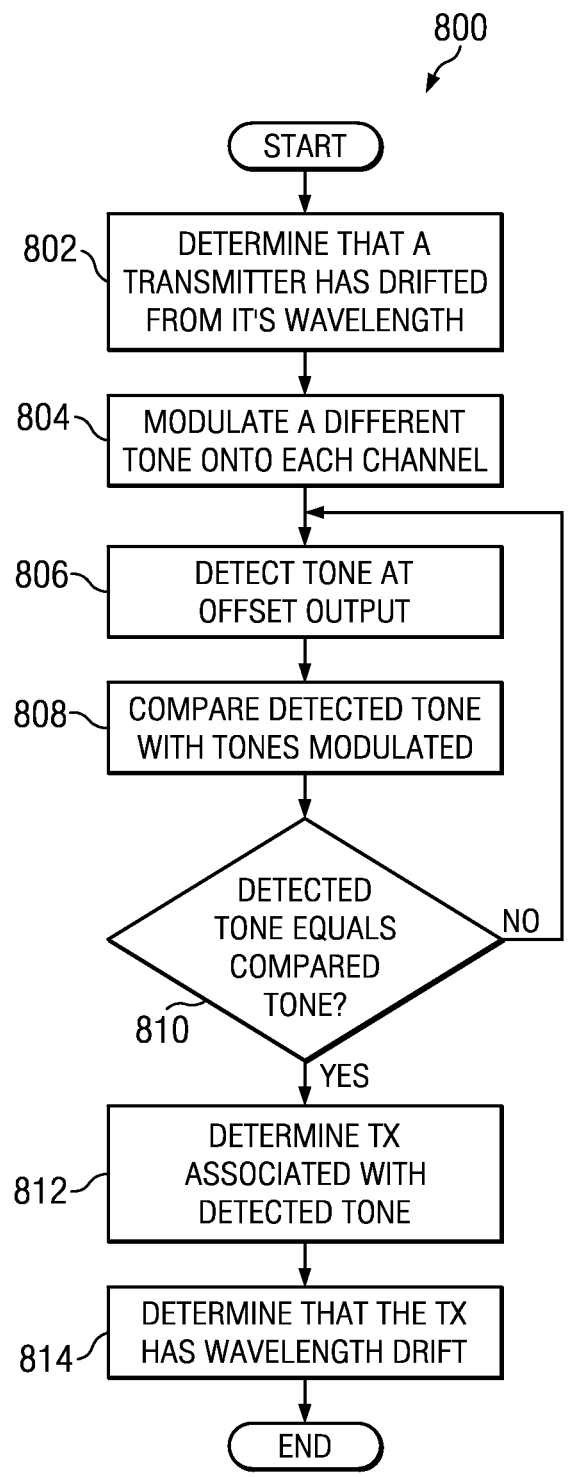
FIG. 8 illustrates an example method for locating a transmitter with a drifted wavelength.

FIG. 8 illustrates an example method 800 for locating a transmitter with a drifted wavelength.

Method 800 starts, and, at step 802, controller 216 may determine that a transmitter has drifted from its desired wavelength. Controller 216 may determine this using method 700 described in FIG. 7, or any other suitable method.

At step 804, controller 216 may modulate a different tone onto each optical signal transmitted by each transmitter 204 within transponder 102. A tone may comprise a unique, low-frequency intensity modulation that is imposed on the wavelength of the channel and easily detectable.

At step 806, controller 216 may detect a tone within the offset signal detected by the offset monitor 214. At step 808, controller 216 may compare the detected tone with one of the other modulated tones associated with each transmitter 204.

At step 810, controller 216 may determine if the detected tone equals the compared tone. If the detected tone does not equal the compared tone, controller 216 may return to step 808 and compare the detected tone with another tone. However, if the detected tone does equal the compared tone, controller 216 may proceed to step 812.

At step 812, controller 216 may determine which transmitter 204 is associated with the detected tone. At step 814, controller 216 may determine that the transmitter 204 associated with the detected tone has wavelength drift and method 800 may end. Thus, controller 216 may locate which transmitter has drifted from its desired wavelength.

Modifications, additions, or omissions may be made to method 800 without departing from the scope of the disclosure. For example, in alternative embodiments, controller 216 may modulate a single tone onto each optical signal transmitted by each transmitter, one at a time, instead of modulating a different tone onto each channel at the same time. Thus when the tone is detected on the offset signal, controller 216 may know which transmitter is associated with the offset signal.

Also, although method 800 has been described with respect to controller 216 performing the steps, any appropriate component included within transponder 102 may perform, one or more of the steps described without departing from the scope of the disclosure.

Controller 216, power monitors 208 and offset monitors 214 may also facilitate interfacing a new module 104 with a transponder 102. A new module 104 may be interfaced with a transponder 102 upon replacement of a defective module 104, or initialization of a transponder 102.

Figure 9:
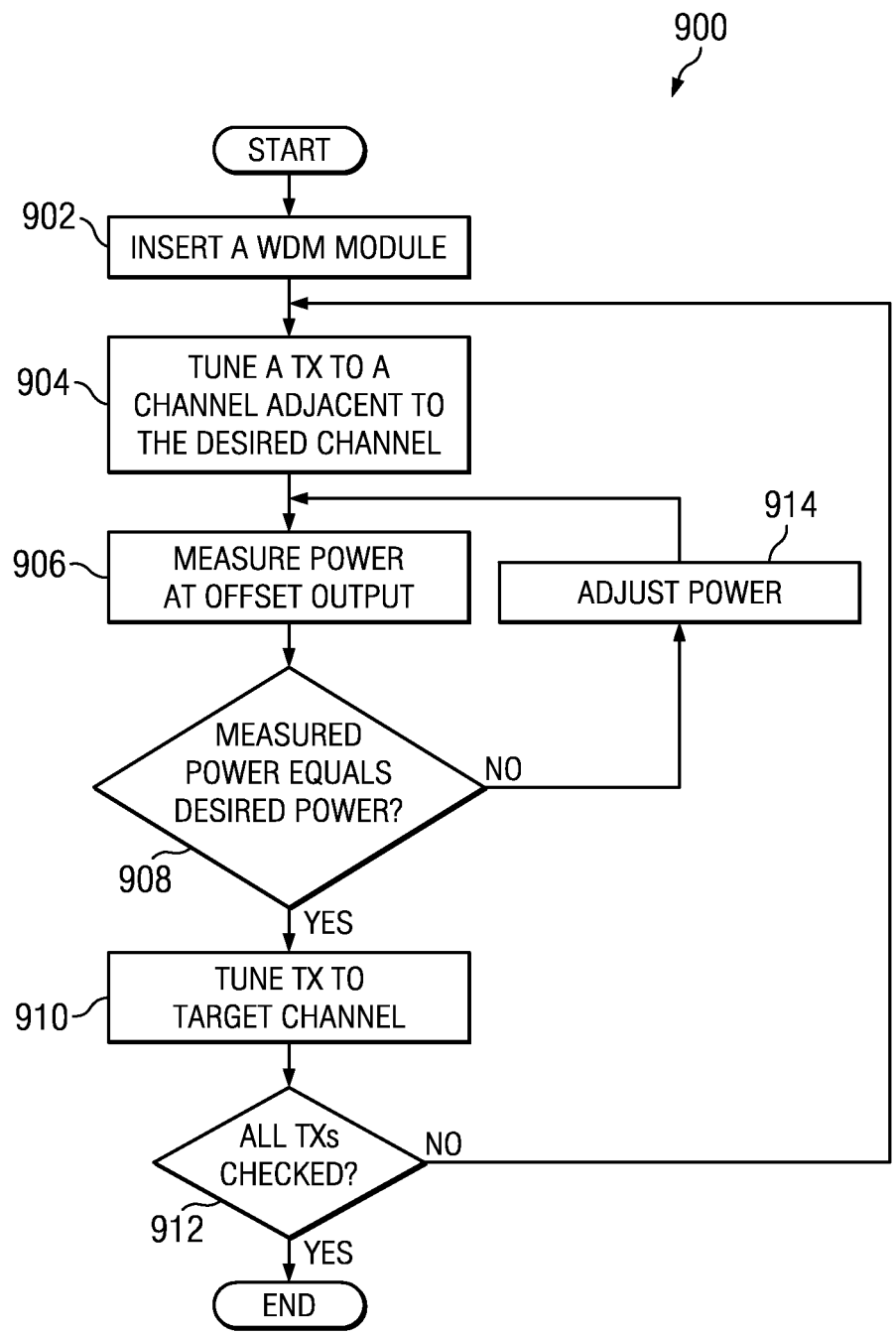
FIG. 9 illustrates an example method for configuring a WDM module.

FIG. 9 illustrates an example method 900 for configuring a WDM module 104.

Method 900 may start, and, at step 902, a module 104 may be inserted into transponder 102. Once a new module 104 is inserted into a slot included in transponder 102, the power of the optical output signal may need to be set to a desired level. The power level of each individual optical signal transmitted by each transmitter 204 may need to be set and measured individually to create the desired power level of the optical output signal of the entire module 104. If the power level of the optical output signal as a whole of the new module 104 were set, the power of one transmitter 204 may be much higher than another transmitter 204, but the power level of the module 104 as a whole may still be at the desired power level.

To ensure that each transmitter 204 is transmitting at a desired power level, controller 216 may use offset monitor 214A or 214B.

At step 902 controller 216 may tune a transmitter 204 of the new module 104 to the channel adjacent to the desired channel of that transmitter 204, thus creating an optical output signal at one of the offset outputs 212 to be detected or measured by one of the offset monitors 214.

At step 904, controller 216 may measure the power of the optical signal received at the offset output 212 using the offset monitor 214 that corresponds with the offset output 212. In alternative embodiments, offset monitor 214 may include its own controller that measures the power of the optical signal detected by offset monitor 214, and that controller may convey that information to controller 216.

At step 908, controller 216 may determine if the measured power from the offset output 212 equals a desired power, or is in a range of acceptable power, for that transmitter. A system administrator may determine the desired power for each transmitter 204. If the measured power equals the desired power, or is in a range of acceptable power, method 900 may proceed to step 910. If the measured power does not equal the desired power, or is not within the range of acceptable power, method 900 may proceed to step 914.

At step 910, with the transmitter power adjusted to the desired power level, controller 216 may tune the transmitter 204 from the adjacent channel to the target channel.

At step 912, controller 216 may determine if all of the transmitters 204 in the new module have been adjusted to their desired power level. If all the transmitters 204 have been adjusted, method 900 may end. Otherwise, method 900 may return to step 904 and controller 216 may tune another transmitter to the channel adjacent to the desired or target channel until the power of all transmitters has been adjusted.

At step 914, if, at step 908, the measured power does not equal the desired power for that transmitter 204, controller 216 may adjust the power of the transmitter 204. After step 914, controller 216 may return to step 906 to measure the power again. Controller 216 may repeat steps 908, 914 and 906 until the power measured by the offset monitor 214 equals the desired power level for that transmitter 204. After adjustment of all transmitter power levels of a WDM module, the total output power at the output of the module may be recorded as a reference to detect output power degradation or failure.

The system may perform regular re-calibration of output power during which traffic may be temporarily redirected to a spare channel.

Modifications, additions, and omissions may be made to method 900 without departing from the scope of the disclosure. For example, by utilizing more than one offset monitor at a time, controller 216 may adjust the power of more than one transmitter 204 at a time.

As mentioned previously, modules 104 may comprise active modules 104 and spare modules 104 and when a transmitter 204 within an active module 104 fails, transponder 102 may direct traffic from the failed channel to a spare channel by sending electrical signals away from the failed active transmitter 204 to a spare transmitter 204 included in the spare module 104. The term "active" may refer to any module 104, transmitter 204 or channel designated to be currently transmitting or carrying optical signals. The term "spare" may refer to any module 104, transmitter 204, or channel configured to transmit or carry traffic that may have initially been associated with an active module 104, transmitter 204, or channel.

Figure 10:
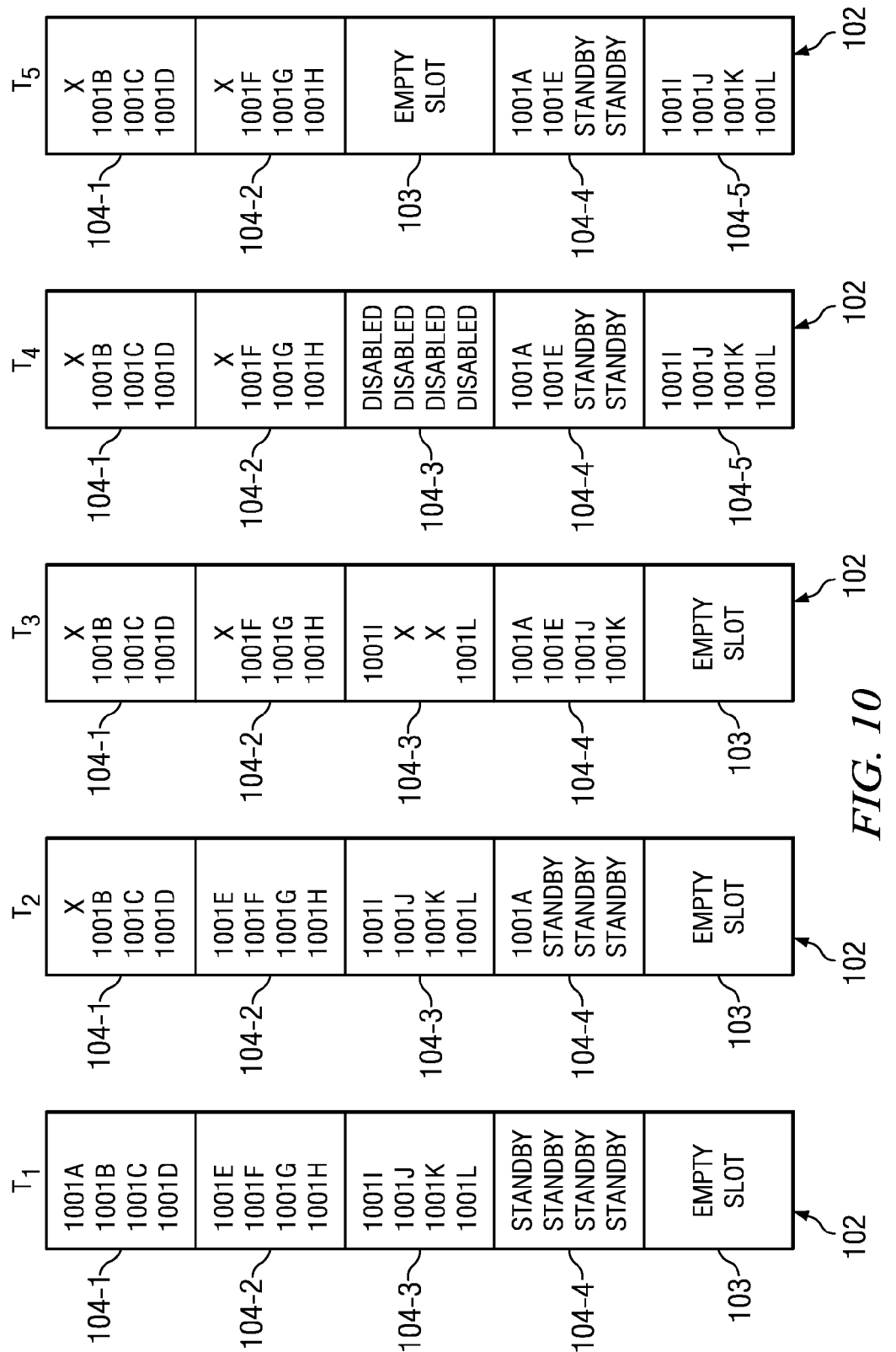
FIG. 10 illustrates an example implementation and utilization of active and spare modules within a transponder.

FIG. 10 illustrates an example implementation and utilization of active and spare modules 104 within a transponder 102.

Transponder 102 may include modules 104-1, 104-2, 104-3 and 104-4. Transponder 102 may also include an empty slot 103. Modules 104 may each include four transmitters 204 as depicted in FIG. 2. However, in alternative embodiments, modules 104 may include more or fewer than four transmitters. Although four modules 104 are depicted, transponder 102 may include more or fewer modules 104 than those depicted. For example, transponder 102 may include thirty modules 104 as depicted in FIGS. 1 and 2. Additionally, transponder 102 may include more than the one empty slot 103 depicted. The number of modules 104 and spare slots 103 depicted is merely for illustrative purposes.

At time T1, modules 104-1-104-3 may comprise active modules and transponder 102 may send electrical signals 1001 to transmitters 204 included in modules 104-1-104-3 accordingly. For example, transponder 102 may respectively send electrical signals 1001A, 1001B, 1001C and 1001D to the four transmitters 204 (not expressly shown) included in module 104-1; transponder 102 may respectively send electrical signals 1001E, 1001F, 1001G and 1001H to the four transmitters 204 (not expressly shown) included in module 104-2; etc. Additionally, module 104-4 may comprise a spare module, thus, transponder 102 may initially send no electrical signals to the transmitters 204 included in module 104-4, such that the transmitters included in module 104-4 are spare transmitters on standby.

In order for spare transmitters 204 to be on standby, the channels associated with those transmitters 204 may not be utilized during normal operation of transponder 102, or utilized for a different non-critical purpose. Those channels may be reserved for transmission of optical signals associated with the redirection of electrical signals to spare transmitters. Accordingly, the bandwidth capabilities of transponder 102 may be higher than the bandwidth requirements of the system in which transponder 102 is implemented.

At time T2, transmitter 204A-1 receiving electrical signals 1001A may fail, causing the failure of the channel associated with the failed transmitter also. Transponder 102 may detect this failure and reroute traffic from the failed transmitter to a spare transmitter by rerouting electrical signals 1001A from failed transmitter 204A-1 in active module 104-1 to spare transmitter 204A-4 included in spare module 104-4. Accordingly, transponder 102 may continue transmitting optical signals without losing bandwidth.

Additionally, the use of empty slot 103 allows for delayed replacement of module 104-1. By allowing for a second spare module, (e.g., leaving a slot empty), immediate replacement of module 104-1 may not be required to prevent a later loss of bandwidth.

For example, if transmitter 204A-2 receiving electrical signals 1001E were to fail, electrical signals 1001E may be rerouted to another spare transmitter 204 included in spare module 104-4. Accordingly, only two of the four spare transmitters in spare module 104-4 may be available for receiving electrical signals, thus leaving only two spare channels available. In the present example, by utilizing a spare slot 103, either module 104-1 or 104-2 may be replaced without losing bandwidth. Another WDM module 104 may be inserted into spare slot 103. Upon removing either module 104-1 or 104-2 to replace the defective module, the traffic carried by the channels associated with the three remaining active transmitters in the removed module may be directed to the channels associated with the replacement module and the system may maintain its bandwidth. Without spare slot 103 available to receive the replacement module, spare module 104-4 may only have two spare transmitters (and consequently two spare channels) available for receiving the traffic directed from the three channels associated with the previously active transmitters of the removed module, thus causing a loss in bandwidth. Accordingly, spare slot 103 allows for delayed replacement of a module with a defective transmitter.

At time T3, before module 104-1 has been replaced, transmitter 204A-2 receiving electrical signals 1001E may fail, transmitter 204B-3 receiving electrical signals 1001J may fail, and transmitter 204C-3 receiving electrical signals 1001K may also fail. Based on these failures, transponder 102 may respectively route electrical signals 1001E, 1001J and 1001K to spare transmitters 204B-4, 204C-4 and 204D-4 included in spare module 104-4. Accordingly, transponder 102 may switch traffic from the failed channels associated with the failed transmitters to the spare channels.

Spare module 104-4 may now have electrical signals 1001A, 1001E, 1001J and 1001K routed to each of its transmitters 204 such that no more electrical signals 1001 from other active transmitters 204 may be routed to spare module 104-4. At this point, one or more of the modules 104 with failed transmitters 204 should be replaced because if another transmitter 204 fails, no more spare transmitters 204 are available to receive electrical signals and transmit traffic over spare channels associated with spare transmitters 204. Accordingly, if another transmitter 204 fails, transponder 102's bandwidth may drop below the system requirements, which may cause slower communication, lost information or both.

Additionally, in some embodiments, transponder 102 may be configured to determine an order of replacement of modules 104 based on various factors such as the number of failed transmitters within a module 104 and the fitness of a module 104. Transponder 102 may determine the fitness of a module 104 based on operating hours of the module 104, the temperature of the module 104 and the number of failed transmitters of the module 104. In other embodiments, transponder 102 may also be configured to calculate a recommended time of next service of the transponder based on the total number failed channels before the number of failed channels requires immediate replacement of a module to prevent a loss of bandwidth and traffic. Transponder 102 and/or modules 104 may comprise one or more indicators that indicate the order of removal of one or more modules 104, the fitness of one or more modules 104 and the recommended time of next service. Accordingly, transponder 102 may calculate and provide information for planning of service which may reduce the number of unexpected problems the may require expensive, immediate attention.

Transponder 102 may also include a mechanical locking mechanism (e.g. an electro-magnetic latch) that prevents removal of a module 104 at an inappropriate time to ensure that the module 104 being removed is the module 104 that transponder 102 has prepared for removal. Accordingly, the locking mechanism may prevent an interruption of service due to the improper removal of a module 104.

At time T4, a system technician may insert a replacement module 104—module 104-5—into spare slot 103. Replacement module 104-5 may replace one of modules 104-1, 104-2 or 104-3 because each of those modules includes a failed transmitter. Module 104-3 may be replaced first because it has two failed transmitters 204, instead of one like in modules 104-1 and 104-2. Although module 104-3 may be replaced first because it has the most failed transmitters 204, module 104-3 does not necessarily need to be replaced first. At time T4, transponder 102 may switch from routing traffic over the channels associated with module 104-3 to routing traffic over the channels associated with new module 104-5.

For example, transponder 102 may route all the electrical signals 1001 that were originally sent to module 104-3 to new module 104-5. For example, transponder 102 may route electrical signals 1001I and 1001L from transmitters 204A-3 and 204D-3, included in active module 104-3, to transmitters 204A-5 and 204D-5 included in new module 104-5, and transponder 102 may route electrical signals 1001J and 1001K from transmitters 204C-4 and 204D-4, included in spare module 104-4, to transmitters 204B-5 and 204C-5 included in new module 104-5.

Accordingly, spare transmitters 204C-4 and 204D-4, and their respective channels, included in spare module 104-4 may be available again for transmitting and carrying traffic if another active transmitter 204 fails. Additionally, module 104-3 may be disabled to allow removal of module 104-3 without disrupting any traffic.

At time T5, module 104-3 may be removed to leave a spare slot 103 that may be used to receive another replacement module 104. Modules 104-1 and 104-2 may also be replaced later using the same method. Alternatively, because spare module 104-4 has two spare transmitters 204 available, modules 104-1 and 104-2 do not need to be replaced, but may be replaced, if so desired. However, replacing all of the modules at one time may reduce maintenance costs because only one maintenance session is required to replace all three modules instead of having another visit to replace the modules with failed transmitters at a different time. Therefore, by utilizing spare module 104-4 and maintaining an empty slot 103, the frequency of maintenance visits may be reduced, which also may reduce costs.

Modifications may be made to the implementation of spare modules 104 described in FIG. 10 without departing from the scope of the disclosure. For example, electrical signals 1001 do not need to be routed to the particular transmitters 204 described. Electrical signals 1001 may be routed to any of the available spare transmitters 204 included in a spare module 104 without departing from the scope of the invention. Additionally, a transponder 102 may include more or fewer slots 103 and modules 104. Also, each module 104 may include more or fewer transmitters 204. The empty slot 103 may be populated with a WDM module on standby and provide one additional standby channel while allowing in-service repairs, without departing from the scope of the disclosure. Finally, more than one module 104 may be utilized as a spare module 104 depending on the system requirements and capabilities.

Figure 11:
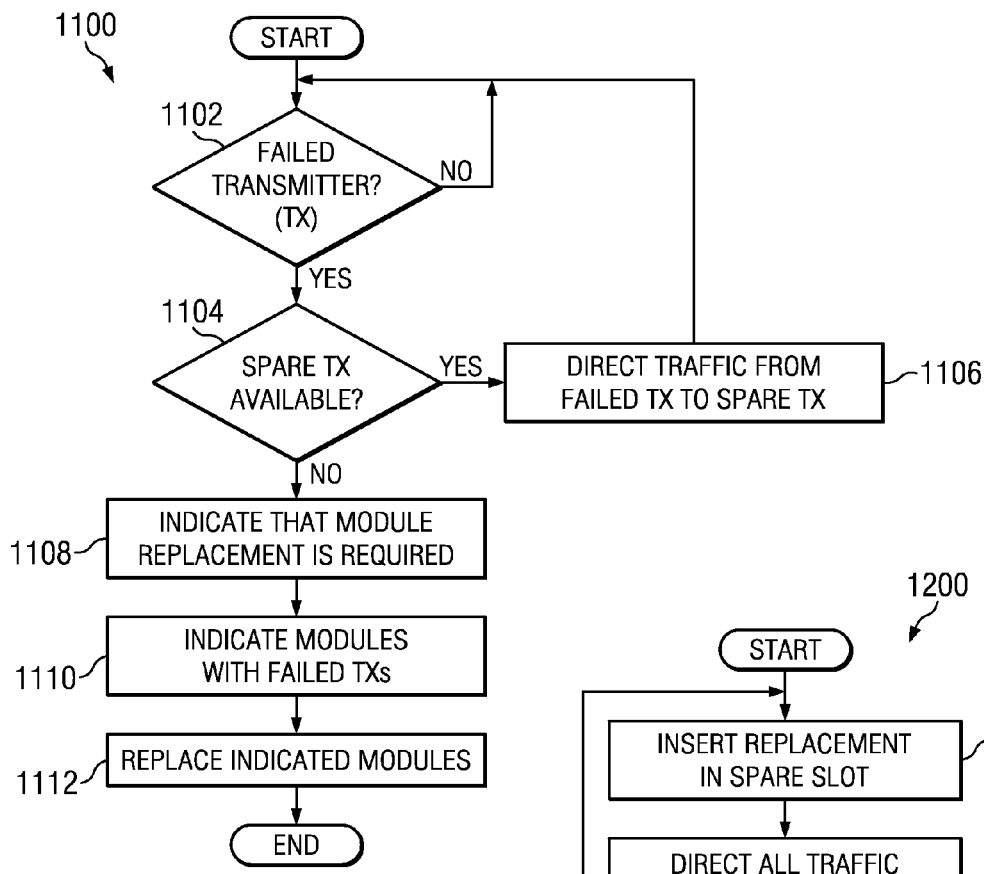
FIG. 11 illustrates an example method for utilizing a spare module and spare slot of a transponder.

FIG. 11 illustrates an example method 1100 for utilizing a spare module 104 and spare slot 103.

Method 1100 may start, and at step 1102, transponder 102 may determine if a transmitter of one of the modules 104 has failed. If a transmitter has not failed, transponder 102 may continue monitoring for failed transmitters at step 1102. But, if a transmitter has failed, method 1100 may proceed to step 1104.

At step 1104, transponder 102 may determine if a channel is available for carrying traffic. In some instances, transponder 102 may determine if a spare transmitter included in a spare module is available for receiving electrical signals originally routed to the failed transmitter. If a spare transmitter is available, at step 1106, transponder 102 may reroute traffic from the failed channel to a spare channel. Transponder 102 may reroute traffic by routing the electrical signals sent to the failed transmitter from the failed transmitter to the available spare transmitter included in the spare module and method 1100 may return to step 1102 where transponder 102 may monitor for more failed transmitters.

If, at step 1104, transponder 102 determines that no spare channels (e.g., spare transmitters) are available, transponder 102 may indicate, at step 1108, that a replacement module is required. Transponder 102 may send a signal that alerts a network administrator, or perform any other suitable operation that may notify an administrator that no more spare transmitters are available and that the transmission bandwidth is not protected from failures.

If the policy is to ensure protection at all time, and the transponder 102 determines at step 1104 that there are 2 or less spare transmitters available, transponder 102 may direct electrical signals from a failed transmitter 102 to a spare transmitter 102, and at the same time indicate that module replacement is required.

At step 1110, transponder 102 may indicate which modules 104 include failed transmitters. In some embodiments, transponder 102 may send a signal that activates indicator 112. Indicator 112 may generally indicate that a module includes failed transmitters, indicator 112 may more specifically indicate the number of failed transmitters in a module, indicator 112 may indicate which transmitters included in a module has failed, or any combination thereof. Accordingly, maintenance personnel may determine which modules 104 should be replaced and also may determine which modules 104 may have a higher priority for replacement. In addition, the system may provide guidance to the operator in which order to replace failed modules. At step 1112 the modules with failed transmitters may be replaced and method 1100 may end.

Figure 12:
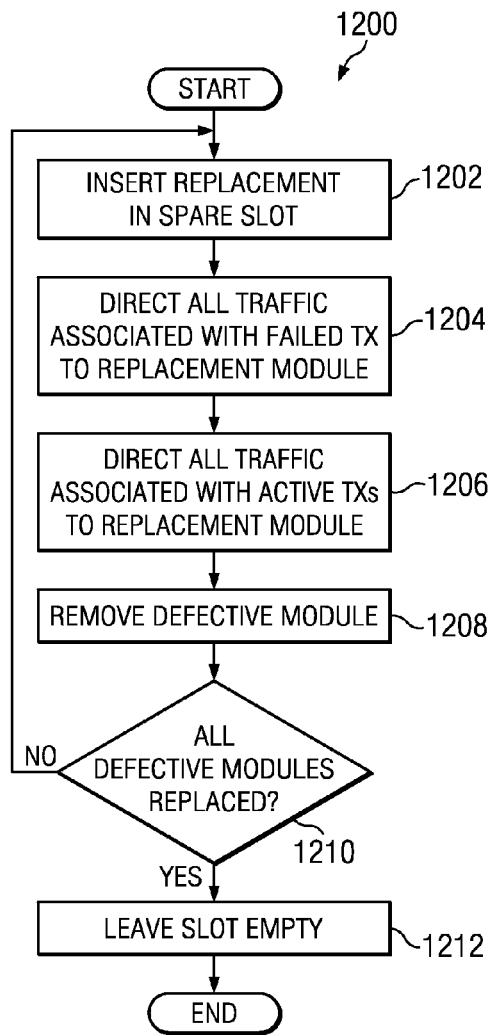
FIG. 12 illustrates an example method for replacing modules with failed transmitters.

FIG. 12 illustrates an example method 1200 for replacing modules with failed transmitters that may be performed in accordance with step 1112 of method 1100.

Method 1200 may start, and, at step 1202, a replacement module may be inserted into a spare slot of transponder 102. At step 1204, transponder 102 may route all the electrical signals originally associated with the failed transmitters, of the module to be replaced, from the spare transmitters presently receiving the electrical signals to the replacement module (e.g., transponder 102 routing electrical signals 1001J and 1001K from spare module 104-4 to replacement module 104-5 at time T4 in FIG. 10).

At step 1206, transponder 102 may route all the traffic sent to the still active transmitters of the module to be replaced to the replacement module (e.g., transponder 102 may route electrical signals 1001I and 1001L from active module 104-3 to replacement module 104-5 at time T4 in FIG. 10). Although steps 1204 and 1206 have been described as two discrete steps, as shown in FIG. 10, transponder 102 may also perform the steps simultaneously.

At step 1208, the defective module may be removed. At step 1210, transponder 102 may determine if all the defective modules have been replaced. If all of the defective modules have been replaced, method 1200 may proceed to step 1212.

If all of the defective modules have not been replaced, method 1200 may return to step 1202 to replace another defective module.

At step 1212, the slot previously occupied by the now removed defective module may be left empty until another module may need to be replaced. Alternatively the empty slot may be populated with an additional spare WDM module, as discussed in further detail with respect to FIG. 13. Following step 1212, method 1200 may end.

Additions, modifications or omissions may be made to method 1200 without departing from the scope of the disclosure. For example, although method 1200 describes repeating method 1200 until all defective modules have been replaced, method 1200 may be utilized to replace fewer than the number of defective modules. Additionally, method 1200 may be used to replace a module that has not been deemed defective, but may be replaced for some other reason.

Figure 13:
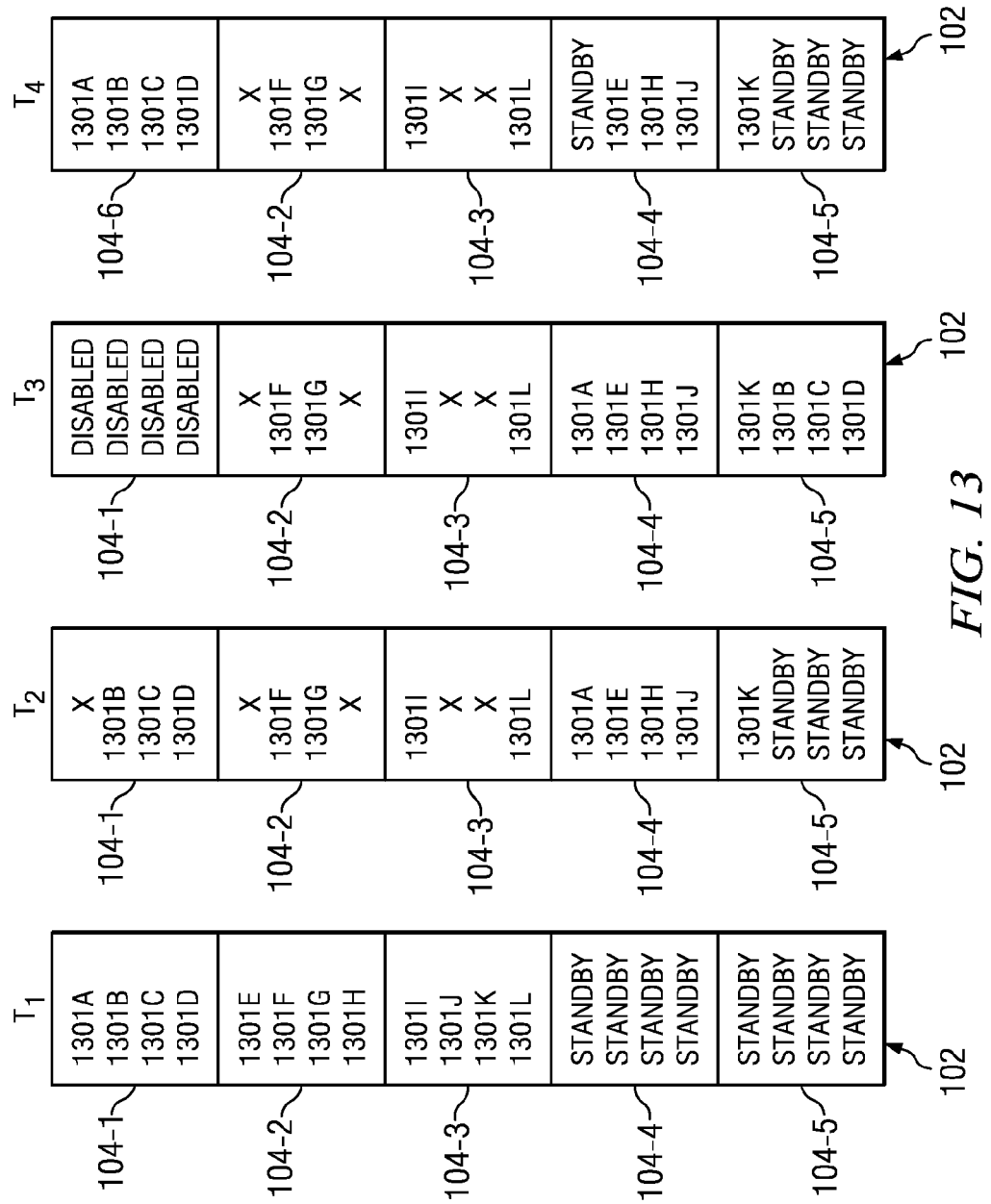
FIG. 13 illustrates an example embodiment of utilizing active and spare modules without a spare slot.

FIGS. 10-12 describe an example of utilizing one spare module with transponder 102 and leaving a slot 103 empty. FIG. 13 illustrates an example embodiment of utilizing active and spare modules without having a spare slot 103.

At time T1, transponder 102 may include active modules 104-1, 104-2, and 104-3. At time T1, transponder 102 may transmit traffic over active channels associated with active transmitters included in active modules 104-1, 104-2, and 104-3. For example, transponder 102 may direct electrical signals 1301, similar to electrical signals 1001 in FIG. 10 to transmitters (not expressly shown) included in active modules 104-1, 104-2, and 104-3 such as described with respect to FIG. 10. Transponder 102 may also include spare module 104-4, like spare module 104-4 in FIG. 10, however, unlike in FIG. 10, transponder 102 may also include spare module 104-5 instead of merely maintaining an empty slot 103, which may make more spare channels available.

At time T2, the transmitters receiving electrical signals 1301A, 1301E, 1301H, 1301J and 1301L may have all failed, causing their respective channels to fail. Transponder 102 may switch from the failed channels to spare channels by redirecting these electrical signals 1301 to spare transmitters included in spare modules 104-4 and 104-5. Transponder 102 may also direct that active modules 104-1, 104-2 and 104-3 indicate that they include one or more defective transmitters, and thus need to be replaced.

With all the spare transmitters being utilized in spare module 104-4 and only three spare transmitters remaining in spare module 104-5, at least one of the active modules 104 with a defective transmitter may need to be replaced before another transmitter fails, if transponder 102 is to maintain the required bandwidth of the system upon replacement of any module with failed transmitters. For example, the transmitter receiving electrical signals 13011 may also fail, thus transponder 102 may redirect electrical signals 13011 to a spare transmitter in spare module 104-5, and thus may utilize another spare channel. However, now only two spare channels (e.g., transmitters) may be available. Replacing module 104-1 may not be accomplished without losing information or bandwidth, because electrical signals sent to three transmitters 204 included in module 104-1 (e.g., electrical signals 1301B, 1301C, and 1301D) need to be redirected before removing module 104-1. Accordingly, a module 104 may be replaced before such a scenario occurs.

To avoid the scenario just described, at time T3, transponder 102 may prepare to have module 104-1 replaced. Transponder 102 may route traffic from the channels associated with module 104-1 to spare channels. For example, the electrical signals 1301 routed to the active, operating transmitters in module 104-1 may be routed to the available spare transmitters of spare module 104-5 (e.g., transponder 102 may route electrical signals 1301B-1301D to transmitters included in module 104-5). After the traffic has been rerouted to spare channels, (e.g., electrical signals have been rerouted), module 104-1 may be disabled.

At time T4, module 104-1 may be replaced by replacement module 104-6. Transponder 102 may route electrical signals 1301A-1301D to the transmitters included in replacement module 104-6. Accordingly, spare module 104-4 may have an available spare transmitter that was previously receiving electrical signals 1301A, and the transmitters included in spare module 104-5 that were receiving electrical signals 1301B-1301D may also be available. Consequently, the spare channels associated with spare module 104-5 may be available to carry traffic. Modules 104-2 and 104-3 may also be replaced in a similar manner such that transponder 102 does not include any defective modules.

Although in the present example only one transmitter may be utilized in module 104-5 before replacement of a module, having two spare modules populating slots in transponder 102 instead of one spare transmitter and one empty slot allows for more transmitters to fail before replacement of modules is necessary. In contrast to FIG. 10, in the present example of FIG. 13, five transmitters may fail instead of four. By populating a spare slot 103, an additional transmitter may fail before needing to replace a defective module. The startup cost of populating the spare slot may be a little higher because one more modules may need to be used upon implementation. However, overall costs may be reduced—allowing for extra transmitters to fail before necessitating a maintenance visit may reduce the number of maintenance visits and costs.

In an alternative example, transponder 102 may be configured to determine the number of failed transmitters per module. If a module has more than one failed transmitter, and transponder 102 can determine this, more spare transmitters may have electrical signals 1301 routed to them before replacement of modules is required.

For example, at time T2, transponder 102 may determine that another active transmitter may fail before replacement of a module is necessary if the module that needs to be replaced is not module 104-1. Modules 104-2 and 104-3 each have two failed transmitters, and therefore each have only two active, operational transmitters receiving electrical signals 1301 and transmitting traffic over channels associated with the two operational transmitters. Accordingly, only two available spare transmitters may be required to remove and replace modules 104-2 and 104-3. Therefore, at time T2, even if another transmitter failed (e.g., the spare transmitter receiving electrical signals 1301A at time T2), requiring rerouting of traffic to another spare channel (e.g., electrical signals 1301A routed from the failed transmitter in module 104-4 to a spare transmitter in 104-5), a sufficient number of spare transmitters may remain available to still replace modules 104-2 and 104-3.

When an empty spare slot is populated with a spare WDM module that may provide additional spare channels, transponder 102 may determine whether a spare transmitter is available in a spare module or not by determining which active WDM module or modules include the largest number of failed channels. Transponder 102 may compare the number of active operational transmitters in the WDM module or modules with the most failed transmitters with the number of un-used spare channels. If the number of un-used spare channels is less than or equal to the number of active, operational channels in the WDM module with the largest number of failed transmitters, transponder 102 may determine that a sufficient number of spare channels are not available.

In case an empty spare slot is populated and if the policy is to ensure protection at all times, transponder 102 may direct traffic from a failed transmitter to a spare, and at the same time indicate that module replacement is required if the number of un-used spare channels is one more than the number of un-used spare channels or less.

However, in such a scenario, the module or modules with the largest number of failed transmitters may need to be replaced first to prevent bandwidth loss. Accordingly, transponder 102 and the modules 104 may also require functionality to indicate which modules should be replaced first, allowing maintenance personnel to replace the modules in the proper order. In some embodiments, transponder 102 may direct indicator 112 to indicate the replacement priority of a module, which module or modules include the most failed transmitters, which individual transmitters have failed in each module or any combination thereof. Depending on the technology used for the tunable transmitters, one failed transmitter may be the result of worse than average reliability of all the transmitters in the WDM module, making failure of multiple transmitters in the same module more likely. Thus, potentially, even a larger number of transmitters may fail before requiring replacement of a module, further reducing the costs associated with maintenance visits.

Modification, additions, or omissions may be made to the implementation of spare modules as described in FIG. 13. For example, more spare modules 104 may be utilized and transponder 102 may also include more or fewer active modules 104. Additionally, although module 104-1 was described as being the first module to be replaced, modules 104 may be replaced in any order without departing from the scope of the disclosure.

Also, transponder 102 in FIG. 13 may be configured to determine a fitness of modules 104, replacement order of modules 104 and a next time of service of transponder 102 similar to that described with respect to FIG. 10. Additionally, transponder 102 may include a mechanical locking mechanism similar to that described with respect to FIG. 10.

In yet other embodiments, a traffic distribution circuit comprising a controller and SerDes switch may be configured to duplicate traffic and send one copy to a spare channel. In other embodiments, the traffic distribution circuit may be configured such that traffic carried by a failed channel is transmitted in any other way using spare channels to maintain a particular guaranteed transmission capacity.

For example, the traffic distribution circuit could use four wavelengths from spare module 104-4 and one wavelength from spare module 104-5 partially, to transmit traffic corresponding to one failed channel across all five physical spare channels. Accordingly, the spare channels may comprise virtual or logical spare channels instead of physical spare channels.

Figure 14:
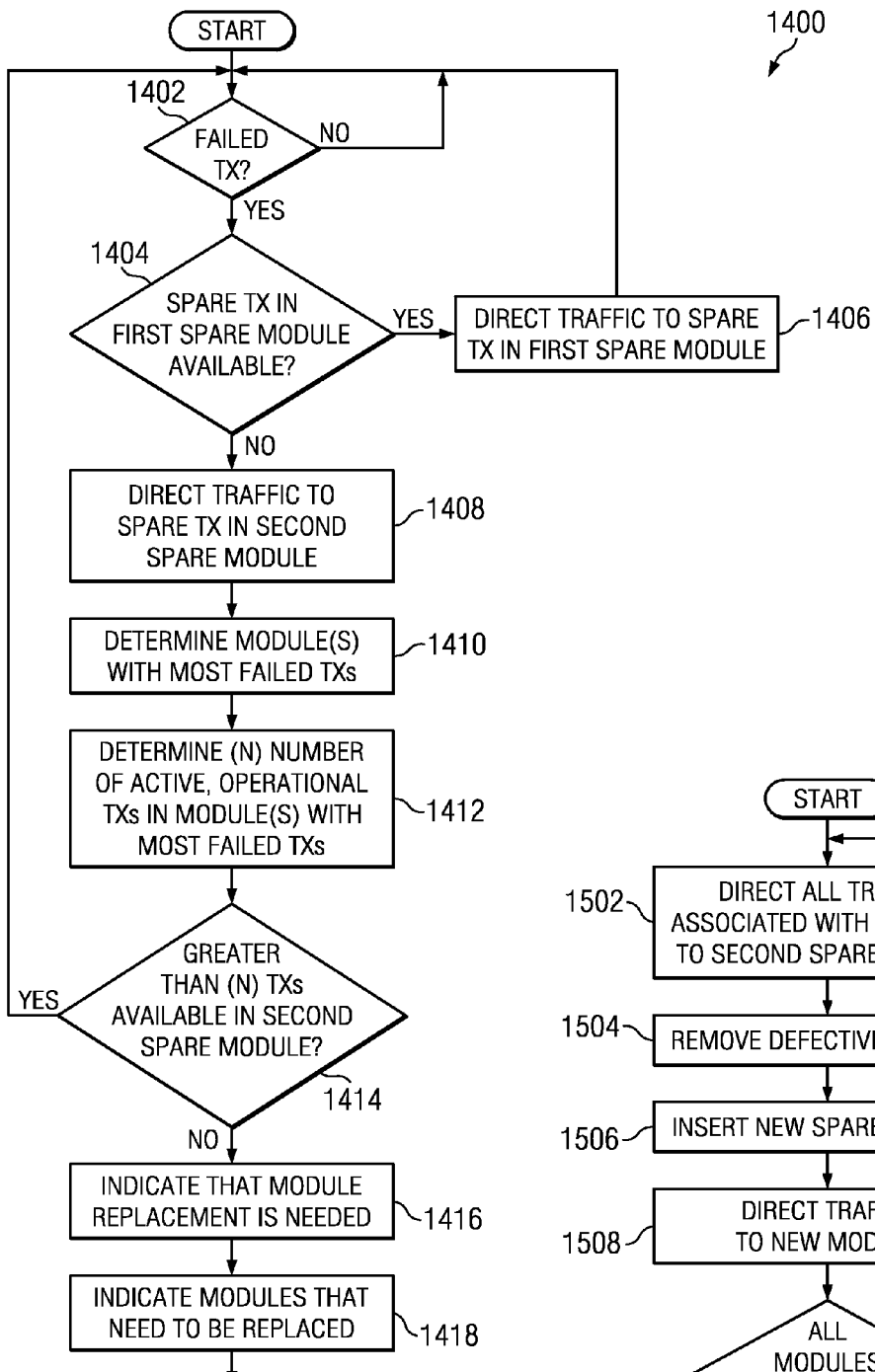
FIG. 14 illustrates an example method for utilizing two spare modules that are populating two spare slots in a transponder.

FIG. 14 illustrates an example method 1400 for utilizing two spare modules that are populating two spare slots in a transponder 102. Method 1400 may start, and, at step 1402, transponder 102 may determine if a transmitter included in a module has failed. If a transmitter has failed, method 1400 may proceed to step 1404, otherwise, method 1400 may return to the beginning.

At step 1404, transponder 102 may determine if a spare transmitter associated with a spare channels in the first spare module is available. If the first spare module includes a spare transmitter, transponder 102 may direct electrical signals from the failed transmitter to the spare transmitter at step 1406, such that traffic is rerouted to spare channels. Following step 1406, transponder 102 may resume detecting failed transmitters at step 1402. If no spare transmitters are available in the first spare module at step 1404, at step 1408, transponder 102 may direct electrical signals to a spare transmitter included in the second spare module, such that traffic is rerouted to a spare channel associated with the second spare module At step 1410, transponder 102 may determine which module or modules include the most failed transmitters. At step 1412, transponder 102 may also determine the number of active, operational transmitters in the module or modules that include the most failed transmitters. In another embodiment, transponder 102 may perform steps 1410 and 1412 in reverse order or simultaneously.

At step 1414, if the number of available spare transmitters associated with spare channels available in the second spare module is greater than the number of active, operational transmitters in the module or modules that include the most failed transmitters, method 1400 may return to step 1402 and transponder 102 may monitor for more failed transmitters. Otherwise, method 1400 may proceed to step 1416.

At step 1416, transponder 102 may indicate that one or more modules need to be replaced. As noted above, once only the number of available spare transmitters in the second spare module is less than or equal to the number of active, operating transmitters in the WDM module or modules with the most failed transmitters, one or more modules with failed transmitters may need to be replaced before another transmitter fails in order to prevent bandwidth loss.

At step 1418, transponder 102 may indicate which modules need to be replaced and also may indicate the priority of replacement of modules (e.g., replacement of modules with the largest number of failed transmitters first). Following step 1418, the modules with failed transmitters may be replaced and method 1400 may end.

In the event that the transponder determines there are no spare channels available and in actuality there will be un-used transmitters available to carry traffic, transponder 102 may still redirect traffic from additional failed transmitters. In this situation, repairing the system without capacity reduction may become impossible but reduction of capacity can be delayed and a critical-level alarm can be raised, providing time to find alternate solutions to preserve bandwidth.

Additions, modifications or omissions may be made to method 1400 without departing from the scope of the disclosure. For example, steps 1416 and 1418 may be combined or performed in reverse order than that described. Additionally, transponder 102 may determine that modules need to be replaced once electrical signals are sent to one transmitter in the second spare module, allowing for replacement of any module with failed transmitters without prioritizing the order of replacement. Such an implementation may eliminate the need to perform steps 1410, 1412 and 1414. Also, If the policy is to maintain a state where the traffic is protected, the warning or alarm to replace modules should be given before the last spare channel is used. Additionally, the transponder may redirect traffic to spare channels even if this would make it impossible to replace WDM modules without reducing bandwidth.

Figure 15:
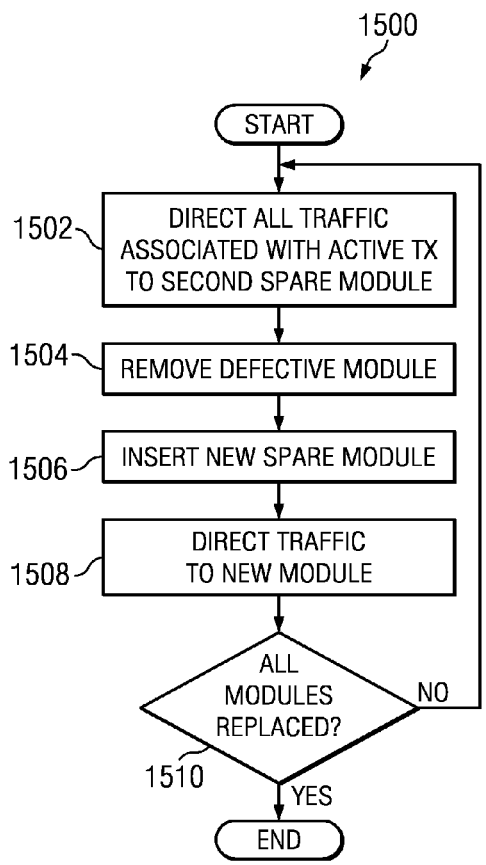
FIG. 15 illustrates another example method for replacing modules with failed transmitters.

FIG. 15 illustrates an example method 1500 for replacing modules with failed transmitters in accordance with step 1420 of method 1400.

Method 1500 may begin and, at step 1502, transponder 102 may route all electrical signals away from the active transmitters of the module to be replaced to the available spare transmitters in the second spare module. Consequently, the traffic may be rerouted to the channels associated with the second spare module.

At step 1504, the defective module may be removed, and at step 1506 a new module may be inserted in the slot previously occupied by the defective module.

At step 1508, transponder 102 may direct the electrical signals that were originally associated with the defective module to the transmitters included in the new module, to now route traffic to the channels associated with the new module. At step 1510, it may be determined if all of the defective modules have been replaced. If all the defective modules have been replaced, method 1500 may end, otherwise, method 1500 may return to step 1502.

Additions, modifications or omissions may be made to method 1500 without departing from the scope of the disclosure. For example, method 1500 may be utilized to replace fewer than all of the defective modules. Additionally, method 1500 may include steps indicating the priority of each module to be replaced.

Although the present disclosure and its advantages have been described in detail, it should be understood that various changes, substitutions and alterations can be made herein without departing from the spirit and scope of the disclosure as defined by the following claims.

What is claimed is:

1. A system for transmitting an optical signal using a plurality of wavelength bands, each wavelength band including a plurality of channels, the system comprising:
    a traffic distribution circuit configured to distribute traffic to a plurality of WDM modules;
    a first (WDM) module coupled to the traffic distribution circuit and comprising:
        a first plurality of tunable optical transmitters, each transmitter associated with a different wavelength band of the plurality of wavelength bands and tuned to transmit optical signals in a first channel included within the associated wavelength band of the transmitter; and
        a first multiplexer coupled to the first plurality of transmitters and configured to combine the optical signals transmitted from the first plurality of transmitters into a first optical signal comprising the plurality of wavelength bands;
    a second WDM module coupled to the traffic distribution circuit and comprising:
        a second plurality of tunable optical transmitters, each transmitter associated with a different wavelength band of the same plurality of wavelength bands associated with the first WDM module and tuned to transmit optical signals in a second channel included within the associated wavelength band of the transmitter; and
        a second multiplexer coupled to the second plurality of transmitters and configured to combine the optical signals transmitted from the second plurality of transmitters into a second optical signal comprising the same plurality of wavelength bands associated with the first WDM module; and
    a cyclic multiplexer coupled to the first and second WDM modules and configured to combine the first and second optical signals into an optical output signal.

2. The system of claim 1, further comprising a power monitor coupled to at least one of the first and second WDM modules and configured to measure power of the first and second optical signals.

3. The system of claim 2, wherein the power monitor is configured to detect a failure of one or more tunable optical transmitters of the associated WDM module based on the measured power.

4. The system of claim 2, further comprising a controller coupled to the power monitor and configured to compare the measured power with a target power and determine whether a tunable optical transmitter has failed based on the comparison.

5. The system of claim 1, wherein the cyclic multiplexer further comprises:
    a first input port configured to receive the first channels included within the plurality of wavelength bands; and
    a second input port configured to receive the second channels included within the plurality of wavelength bands; and
    a primary output configured to output combined optical signals from the first and second inputs.

6. The system of claim 5, wherein the cyclic multiplexer further comprises an offset channel output configured to output an offset signal received at one of the input ports, the offset signal transmitted at a channel distinct from one of the channels for which the receiving input port is configured to receive.

7. The system of claim 6, further comprising an offset monitor coupled to the offset channel output and configured to measure power at the offset channel output.

8. The system of claim 7, wherein the offset monitor is configured to detect wavelength drift from at least one of the first and second channels of any portion of the first and second optical signals.

9. The system of claim 1, wherein the first and second WDM modules are identical.

10. The system of claim 1, further comprising a failed transmitter indicator coupled to each of the first and second WDM modules, the failed transmitter indicator configured to indicate when the WDM module includes a failed transmitter.

11. The system of claim 1, wherein the first and second WDM modules are configured to be pluggable with respect to a modular transponder to allow easy insertion and removal of the first and second WDM modules with respect to the modular transponder.

12. The system of claim 1, wherein the first and second WDM modules each include an end configured to couple with a modular transponder, wherein the end comprises both an optical interface and an electrical interface.

13. A method for transmitting an optical signal using a plurality of wavelength bands, each wavelength band including multiple channels, the method comprising:
    distributing, by a traffic distribution circuit, traffic to a plurality of wavelength division multiplexing (WDM) modules;
    tuning a first plurality of tunable optical transmitters included in a first WDM module to a first channel included within each of the plurality of wavelength bands, with each transmitter associated with a different wavelength band of the plurality of wavelength bands;

transmitting by the first plurality of transmitters optical signals in the first channels;

combining by a first multiplexer coupled to the first plurality of transmitters the optical signals transmitted from the first plurality of transmitters into a first optical signal comprising the plurality of wavelength bands;

tuning a second plurality of tunable optical transmitters included in a second wavelength division multiplexing (WDM) module to a second channel included within each of the same plurality of wavelength bands associated with the first WDM module, with each transmitter associated with a different wavelength band of the plurality of wavelength bands;

transmitting by the second plurality of transmitters optical signals in the second channels;

combining by a second multiplexer coupled to the second plurality of transmitters the optical signals transmitted by the second plurality of transmitters into a second optical signal comprising the same plurality of wavelength bands associated with the first WDM module;

combining by a cyclic multiplexer coupled to the first and second WDM modules the first and second optical signals into an optical output signal.

14. The method of claim 13, further comprising measuring power of the first and second optical signals by a power monitor coupled to at least one of the first and second WDM modules.

15. The method of claim 14, further comprising detecting failure of one or more transmitters of the associated WDM module based on the measured power.

16. The method of claim 14, further comprising comparing, by a controller coupled to the power monitor, the measured power with a target power and determining whether a transmitter has failed based on the comparison.

17. The method of claim 13, further comprising:

receiving, by the cyclic multiplexer, the first optical signal at a first port configured to receive the first channels within the plurality of wavelength bands;

receiving, by the cyclic multiplexer, the second optical signal at a second port configured to receive the second channels included within the plurality of wavelength bands; and outputting, by the cyclic multiplexer, the combined optical signals from the first and second inputs at a primary output.

18. The method of claim 17, further comprising outputting, by the cyclic multiplexer at an offset channel output, an offset signal received at one of the input ports, the offset signal transmitted at a channel distinct from one of the channels for which the receiving input port is configured to receive.

19. The method of claim 18, further comprising measuring power at the offset channel output by an offset monitor coupled to the offset channel output.

20. The method of claim 18, further comprising detecting, by the offset monitor, wavelength drift from a desired channel of a transmitter and re-tuning the transmitter to the desired channel.

21. The method of claim 19, further comprising adjusting a power level of a tunable optical transmitter comprising: tuning the transmitter to a channel adjacent to its desired channel; measuring the power output at the offset monitor; adjusting the power level to a desired power level based on the measured power; and re-tuning the transmitter to its desired channel.

22. The method of claim 13, wherein the first and second WDM modules are identical.

* * * * *